US012785857B2

(12) United States Patent
Wu

(10) Patent No.: US 12,785,857 B2
(45) Date of Patent: Nov. 3, 2026

(54) DATA TRANSMISSION METHOD AND DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 299 days.

(21) Appl. No.: 17/822,468

(22) Filed: Aug. 26, 2022

(65) Prior Publication Data

US 2022/0407629 A1 Dec. 22, 2022

Related U.S. Application Data

(63) Continuation of application No. PCT/CN2020/077278, filed on Feb. 28, 2020.

(51) Int. Cl.
*H04L 1/1812* (2023.01)
*H04L 5/00* (2006.01)

(52) U.S. Cl.
CPC .......... *H04L 1/1812* (2013.01); *H04L 5/0053* (2013.01); *H04L 5/0078* (2013.01)

(58) Field of Classification Search
CPC .... H04L 1/1812; H04L 5/0053; H04L 5/0078
See application file for complete search history.

(56) References Cited

U.S. PATENT DOCUMENTS

| | | | | |
|---|---|---|---|---|
| 7,594,153 B2 * | 9/2009 | Kim | H04L 1/1812 714/751 |
| 11,082,954 B2 * | 8/2021 | Huang | H04L 1/1861 |
| 2009/0219851 A1 * | 9/2009 | Abraham | H04L 1/1812 370/315 |
| 2012/0051329 A1 * | 3/2012 | Hirano | H04L 1/0026 370/332 |

(Continued)

FOREIGN PATENT DOCUMENTS

| | | |
|---|---|---|
| CN | 109075909 | 12/2018 |
| CN | 110178389 | 8/2019 |

(Continued)

OTHER PUBLICATIONS

OPPO, "Discussion on DRX operation in NTN," 3GPP TSG-RAN WG2 Meeting #108, R2-1915167 (Revision of R2-1913336), Nov. 2019.

(Continued)

*Primary Examiner* — Hassan A Phillips
*Assistant Examiner* — Sang C Lee
(74) *Attorney, Agent, or Firm* — Hodgson Russ LLP

(57) ABSTRACT

A data transmission method and a device are disclosed. The method comprises: receiving, by a terminal device, first indication information from a network device, the first indication information being configured to determine a state of an hybrid automatic repeat request (HARQ) feedback function corresponding to a first pre-configured resource, and the state of the HARQ feedback function comprising a disabled state or an enabled state; determining, by the terminal device, the state of the HARQ feedback function corresponding to the first pre-configured resource based on the first indication information.

20 Claims, 6 Drawing Sheets

(56) References Cited

U.S. PATENT DOCUMENTS

| | | | | |
|---|---|---|---|---|
| 2016/0261391 | A1* | 9/2016 | Chen | H04L 1/1861 |
| 2019/0327031 | A1* | 10/2019 | Fan | H04L 1/1812 |
| 2021/0258104 | A1* | 8/2021 | Ye | H04W 72/23 |
| 2021/0377912 | A1* | 12/2021 | El Hamss | H04L 1/1854 |
| 2021/0391960 | A1* | 12/2021 | Wu | H04L 1/1861 |
| 2022/0239417 | A1* | 7/2022 | Cheng | H04L 1/1835 |
| 2022/0264614 | A1* | 8/2022 | Yu | H04W 72/23 |
| 2022/0376879 | A1* | 11/2022 | Li | H04L 1/1861 |
| 2022/0386329 | A1* | 12/2022 | Yu | H04W 72/23 |
| 2022/0394702 | A1* | 12/2022 | Lee | H04L 1/1812 |

FOREIGN PATENT DOCUMENTS

| | | |
|---|---|---|
| CN | 110519025 | 11/2019 |
| EP | 3866368 | 8/2021 |
| WO | 2019242755 | 12/2019 |

OTHER PUBLICATIONS

WIPO, International Search Report and Written Opinion for PCT/CN2020/077278, Nov. 18, 2020.

Mediatek Inc., "Summary Delay-tolerant re-transmission mechanisms in NR-NTN," 3GPP TSG WG1 Meeting #96bis, R1-1905840, Xi'an, China, Apr. 8-12, 2019.

Mediatek Inc., "Summary for more delay-tolerant re-transmission mechanisms in NR-NTN," 3GPP TSG WG1 Meeting #97, R1-1907656, Reno, Nevada, USA, May 13-17, 2019.

EPO, Extended European Search Report for EP Application No. 20922160.5, Feb. 23, 2023.

EPO, Communication for EP Application No. 20922160.5, Apr. 3, 2025.

* cited by examiner

DATA TRANSMISSION METHOD AND DEVICE

CROSS REFERENCE TO RELATED APPLICATIONS

The present application is a continuation of International Patent Application No. PCT/CN2020/077278, filed Feb. 28, 2020, the entire disclosure of which is incorporated herein by reference.

TECHNICAL FIELD

The present disclosure relates to the field of communication technologies, and in particular, to a data transmission method, apparatus and device.

BACKGROUND

A non-terrestrial network (NTN) includes a communication network between a terminal device and a satellite (also referred to as a network device).

In the NTN system, a retransmission can be performed through a hybrid automatic repeat request (HARQ) mechanism. In the HARQ mechanism, after the terminal device has received downlink data corresponding to an HARQ process sent by the network device, the terminal device decodes the downlink data, and sends HARQ feedback to the network device according to the decoding result. Only after the network device has received the HARQ-ACK feedback sent by the terminal device, can the network device send other downlink data corresponding to the HARQ process to the terminal device. However, the transmission delay between the terminal device and the network device is relatively large, and the interactions times for data transmission through the HARQ mechanism is great, thus the efficiency of data transmission through the HARQ mechanism is low.

SUMMARY OF THE DISCLOSURE

According to a first aspect of the present disclosure, a data transmission method is provided. The method includes: receiving, by a terminal device, first indication information from a network device, the first indication information being configured to determine a state of an hybrid automatic repeat request (HARQ) feedback function corresponding to a first pre-configured resource, the state of the HARQ feedback function including a disabled state or an enabled state; and determining, by the terminal device, the state of the HARQ feedback function corresponding to the first pre-configured resource based on the first indication information.

According to a second aspect of the present disclosure, a terminal device is provided. The terminal device includes a transceiver, a processor, and a memory.

The memory stores a computer-executable instruction.

The processor is configured to execute the computer-executable instruction stored in the memory, such that the processor implements the data transmission method as provided in any one of the first aspect.

According to a third aspect of the present disclosure, a network device is provided. The network device includes a transceiver, a processor, and a memory.

The memory stores a computer-executable instruction.

The processor is configured to execute the computer-executable instruction stored in the memory, such that the processor implement the data transmission method, including: determining first indication information, the first indication information being configured to indicate a state of an hybrid automatic repeat request (HARQ) feedback function corresponding to a first pre-configured resource, the state of the HARQ feedback function comprising a disabled state or an enabled state; sending the first indication information to a terminal device, the first indication information being configured for the terminal device to determine the state of the HARQ feedback function corresponding to the first pre-configured resource.

DETAILED DESCRIPTION

Figure 1:
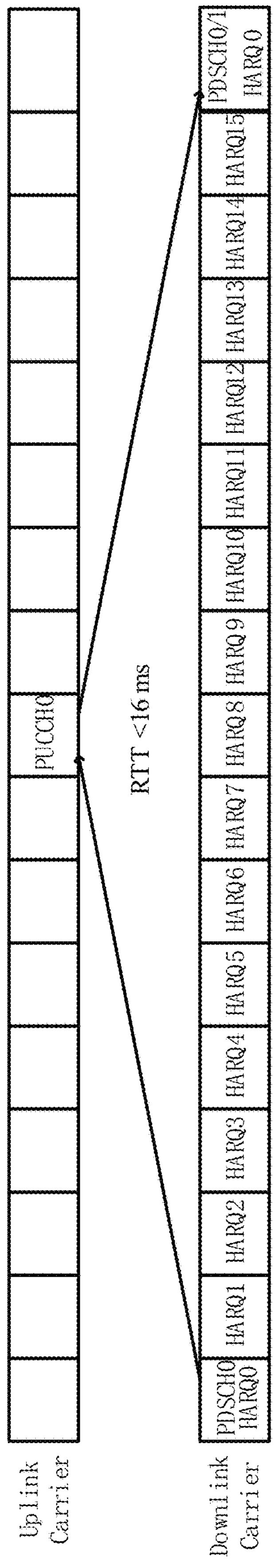
FIG. 1 is a schematic diagram of an HARQ process and RTT according to an embodiment of the present disclosure.

The concepts involved in the present disclosure will be described first for ease of understanding.

The technical solutions of the embodiments of the present disclosure can be applied to various communication systems, for example: a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a Non-Terrestrial Networks (NTN) system, a universal mobile telecommunication system (UMTS), a wireless local area networks (WLAN), a wireless fidelity (Wi-Fi), a next-generation communication (5th-generation, 5G) system or other communication systems, etc.

Generally, traditional communication systems support a limited number of connections and are easy to implement. However, with a development of the communication technology, mobile telecommunication systems will not only support traditional communications, but will also support, for example, a device to device (D2D) communication, a machine to machine (M2M) communication, a machine type communication (MTC) and a vehicle to vehicle (V2V) communication, or V2X communication for vehicular networks etc., to which embodiments of the present disclosure can also be applied.

In some embodiments, the communication system in the embodiment of the present disclosure can be applied to a carrier aggregation (CA) scenario, a dual connectivity (DC) scenario, or a standalone (SA) network-deployment scenario.

The applied spectrum is not limited in the embodiments of the present disclosure. For example, the embodiments of the present disclosure can be applied to licensed spectrum or unlicensed spectrum (also referred to as free spectrum or shared spectrum).

Various embodiments will be described in the present disclosure in conjunction with the network device and the terminal device. The terminal device usually has a wireless transceiver function, and can also be called a user equipment (UE), an access terminal, a subscriber unit, a subscriber station, a mobile station, a mobile port, a remote station, a remote terminal, a mobile device, a user terminal, a terminal, a wireless communication device, a user agent or a user apparatus, etc. The terminal device can be a station (ST) in a WLAN. The terminal device can be a cellular phone, a cordless phone, a session initiation protocol (SIP) phone, a wireless local loop (WLL) station, a personal digital assistant (PDA) device, a handheld device with wireless communication capabilities, a computing device or other processing devices connected to wireless modems, an in-vehicle device, a wearable device, and a next-generation communication system. The next-generation communication system is for example a terminal device in an NR network or a terminal device in a future evolved public land mobile network (PLMN) and the like.

In some embodiments of the present disclosure, the terminal device can be deployed on land, whether being indoor or outdoor, handheld, wearable or vehicle-mounted. The terminal device can also be deployed on water (such as in ships, etc.). The terminal device can also be deployed in the air (such as in an aircraft, a balloon, and in a satellite, etc).

In the embodiments of the present disclosure, the terminal device be a mobile phone, a Pad, a computer with a wireless transceiver function, a virtual reality (VR) terminal device, an augmented reality (AR) terminal device, a wireless terminal for industrial control, an in-vehicle terminal device, a wireless terminal for self-driving, a wireless terminal device for remote medical, a wireless terminal device for smart grid, a wireless terminal device for transportation safety, a wireless terminal device for smart city, a wireless terminal device for smart home, a wearable terminal device, etc. The terminal device involved in the embodiments of the present disclosure can also be referred to as a terminal, a user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a UE agent or a UE apparatus, etc. The terminal device can be stationary or mobile.

As an example but not a limitation, in some embodiments of the present disclosure, the terminal device can be a wearable device. The wearable device can also be referred to as a wearable smart device, which is a general term for devices that are wearable and developed from intelligent design of daily wearable articles through wearable techniques. The wearable devices are for example glasses, gloves, watches, clothing, shoes etc. A wearable device is a portable device that is worn directly on the body or integrated into a user's clothing or accessories. The wearable device is more than a hardware device, but can also realize powerful functions through software support, data interaction, and cloud interaction. In a broad sense, the wearable smart device includes a full-featured and large-sized device, such as a smart watch or a smart glass, all or part of whose functions can be realized without relying on smart phones. The wearable smart device also includes a device focusing on a certain kind of application function and needing to cooperate with other devices like a smart phone, such as all kinds of smart bracelets, smart ornaments for physical sign monitoring.

A network device can be a device configured to communicate with a mobile device. The network device can be an access point (AP) in WLAN, a base transceiver station (BTS) in GSM or CDMA, a NodeB (NB) in WCDMA, or an evolutional NodeB (eNB or eNodeB) in LTE, or a relay station or an access point, or a vehicle-mounted device, a wearable device and a network device (gNB) in the NR network or a network device in the future evolved PLMN network, etc.

In some embodiments of the present disclosure, the network device can have a mobile feature. For example, the network device can be a mobile device. In some embodiments, the network device can be a satellite, a balloon station. For example, the satellite can be a low earth orbit (LEO) satellite, a medium earth orbit (MEO) satellite, a geostationary earth orbit (GEO) satellite, a high elliptical orbit (HEO) satellite etc. In some embodiments, the network device can also be a base station located on the land or in the water.

In some embodiments of the present disclosure, a network device provides services for a cell, and a terminal device communicates with the network device through transmission resources (for example, frequency domain resources, or spectrum resources) used by the cell. The cell can be a cell corresponding to a network device (such as a base station), and the cell may belong to a macro base station or a base station corresponding to a small cell. The small cell here can include: a metro cell, a micro cell, a Pico cell, a Femto cell etc. These small cells have the characteristics of small coverage and low transmit power, and are suitable for providing high-rate data transmission service.

It should be understood that, the terms "system" and "network" are often used interchangeably herein. The term "and/or" herein is used to describe the association relationship of associated objects. For example, the term "and/or" means that there can be three relationships between the associated objects before and after the term. For example, A and/or B can represent three situations: only A exists, A and B exist simultaneously, and only B exists. In the present disclosure, the character "/" generally indicates an "or" relationship between the associated terms before and after the character "/".

In order to better describe the principles and specific implementations of the embodiments in the present disclosure, the related technical contents of the embodiments of the present disclosure are described below.

Downlink control information (DCI): For a terminal device with a downlink service, the network device can schedule a transmission of a physical downlink shared channel (PDSCH) for the terminal device through a downlink grant DCI. The downlink grant DCI can include indication information for determining the PUCCH resource. After the terminal device has received the PDSCH, the terminal device can determine the decoding result (ACK or NACK information) of the PDSCH, and feed the decoding result to the network device through the PUCCH resource. In the NR system, the DCI formats for scheduling the PDSCH transmission include DCI format 1_0, DCI format 1_1, or DCI format 1_2.

For a terminal device with an uplink service, the network device can schedule the transmission of a physical uplink shared channel (PUSCH) for the terminal device through the uplink grant DCI. The uplink grant DCI can include indication information for determining the PUSCH resource. The terminal device can transmit the PUSCH on the determined PUSCH resource based on the uplink grant DCI. In the NR system, the DCI formats for scheduling the PUSCH transmission include DCI format 0_0, DCI format 0_1, or DCI format 0_2.

Pre-configured resource: In order to better serve periodic services, the concept of pre-configured resource is introduced. The pre-configured resource refers to the resource pre-configured by the network device for the terminal device. The pre-configured resource can also be semi-statically configured resource. For example, when the network device configures the pre-configured resource for the terminal device, it can indicate related parameters such as the period of the pre-configured resource. After the network device activates the transmission of the pre-configured resource, the terminal device can use the pre-configured resource according to the period of the pre-configured resource. The terminal device can determine the HARQ process corresponding to the pre-configured resource, based on parameters such as a time domain position of the pre-configured resource, the number of HARQ processes used for transmission of the pre-configured resource, etc.

For example, the network device configures a limited number of HARQ processes for each pre-configured resource. The network device uses these HARQ processes to perform downlink or uplink transmission on the pre-configured resources in a polling manner. Specifically, the network device semi-statically configures resources for the terminal device through high-level signaling. For example, the high-level signaling is RRC signaling. When there is a service requirement, the network device activates the pre-configured resources for the terminal device, so that the terminal device can receive or send service data on the pre-configured resources during each fixed period. In some embodiments, the terminal device can be configured with a pre-configured resource, and the network device can indicate whether the terminal device can perform data transmission on the pre-configured resource by means of activation or deactivation.

The pre-configured resource includes downlink pre-configured resource and/or uplink pre-configured resource. The downlink pre-configured resource includes a semi-persistent scheduling (SPS) resource. The actual downlink grant (or activation command) of the SPS resource can be obtained through a physical downlink control channel (PDCCH) scrambled by the CS-RNTI.

The uplink pre-configured resource includes a configured grant (CG) resource. The CG resource includes two types: type 1 and type 2. In other words, the actual uplink grant (or activation command) of the CG resource can be obtained through the RRC configuration (type 1) or the PDCCH scrambled by the CS-RNTI (type 2).

The activation process of the downlink SPS resource is similar to that of the uplink CG resource of type 2. In the following, the downlink SPS resource is taken as an example for description. For downlink SPS resources, activation and deactivation are mainly performed through the DCI carried by the PDCCH scrambled by CS-RNTI. As an example, if the terminal device receives a DCI scrambled by CS-RNTI, and the NDI field corresponding to an enabled TB (transmission block) is set to “0”, then the terminal device can determine, according to a special field setting of the PDCCH activated by the downlink SPS scheduling or the special field setting of the PDCCH released by the downlink SPS scheduling, whether a downlink SPS scheduling activation command or a downlink SPS scheduling deactivation command (the deactivation command is also referred to as a release command) is received. If the terminal device receives a DCI for deactivation of a SPS PDSCH, then the terminal device is expected to perform corresponding ACK feedback after N symbols. The N symbols are calculated from the last symbol of the PDCCH corresponding to the DCI for the deactivation of the SPS PDSCH. The value of N can be a preset value.

If the terminal device is configured and activates the downlink SPS resource, then the terminal device receives the SPS PDSCH sent on the downlink SPS resource by the network device. The SPS PDSCH is periodically transmitted on the downlink SPS resource, and the SPS PDSCH does not have a corresponding PDCCH scheduling. Since there is no PDCCH scheduling, the SPS PDSCH transmitted on the downlink SPS resource only includes the initial transmission. If the initial transmission of a certain HARQ process fails and needs to be retransmitted, then the network device can schedule the same HARQ process through the DCI scrambled by CS-RNTI, and set the NDI field to “1”. In other words, if the terminal device receives the DCI scrambled by CS-RNTI and the NDI field is set to “1”, then the terminal device will consider the HARQ process scheduled by the DCI to be a retransmission.

In some embodiments, the DCI formats that can be used in the activation command or deactivation command of the downlink SPS resource includes DCI format 1_0, DCI format 1_1 and DCI format 1_2.

In some embodiments, the DCI formats that can be used in the activation command or deactivation command of the uplink CG resource of type 2 includes DCI format 0_0, DCI format 0_1 or DCI format 0_2.

In the present art, the network device indicates the maximum number of HARQ processes in the uplink and downlink to the terminal device, by means such as radio resource control (RRC) signaling semi-statical configuration. If the network device fails to provide corresponding configuration parameters, then the number of downlink HARQ processes can be a default value. For example, the default value is 8. The maximum number of HARQ processes supported by each uplink carrier can be 16. Each HARQ process corresponds to an HARQ process number (HPN). The HARQ process number can also be referred to as an HARQ ID (Identity).

In FIG. 1, the downlink transmission is taken as an example, to illustrate how the number of HARQ processes and the round-trip transmission time (RTT) affect the throughput of data transmission. As shown in FIG. 1, the maximum number of HARQ processes configured for the terminal device is 16. The 16 HARQ processes include HARQ0 to HARQ15. The 16 HARQ processes can be consecutively scheduled within 16 ms. For an HARQ process such as HARQO, after it is scheduled, this HARQ process HARQ0 is in a stop-and-wait state during the data round trip and cannot be used to transmit other data. Therefore, in the scenario shown in FIG. 1 where the maximum number of HARQ processes in the terminal device is 16, the following several scenarios may exist.

If the RTT is less than 16 ms, when there is service data to be transmitted within the RTT range after HARQ0 has been scheduled, the terminal device can always have parallel HARQ processes (one or more of HARQ1 to HARQ15) for data transmission. HARQ0 can be used again for data transmission, when the time after HARQ0 has been scheduled exceeds RTT. Therefore, data can be continuously transmitted on the HARQ entity consisting of HARQ0 to HARQ15 without affecting the maximum throughput of the terminal device. In addition, similarly, if the RTT is equal to 16 ms, and the maximum number of HARQ processes configured for the terminal device is 16, there are always HARQ processes that are ready for transmission of service data. However, if the maximum number of HARQ processes configured for the terminal device is less than 16, then it is possible that, when there is service data to be transmitted, all HARQ processes are in the state of waiting for feedback from the network device, no HARQ processes are available at that time, and the throughput of data transmission of the terminal device would be affected.

If RTT is much greater than 16 ms, e.g. up to 600 ms in an NTN system, then the actual situation may be that, all HARQ processes of the terminal device are in a state of not receiving feedback from the network device, and when there is service data to be transmitted, the terminal device will have no HARQ processes available for a long time, and the throughput of data transmission of the terminal device would be seriously affected.

In other words, in the application scenario of the NTN system or other similar scenarios, a mismatch between the number of HARQ processes configured in the terminal device and the system RTT due to a significant increase in RTT can occur, eventually leading to the degradation of the system performance.

To solve the above-mentioned technical problem, a data transmission method is provided in the embodiments of the present disclosure. For facilitating the understanding of the data transmission method shown in the present disclosure, an architecture of the communication system of the present disclosure is illustrated in conjunction with FIG. 2 and FIG. 3.

Figure 2:
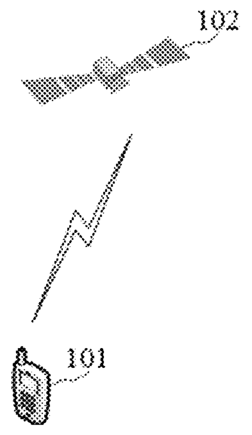
FIG. 2 is a schematic architectural diagram of a communication system according to an embodiment of the present disclosure.

FIG. 2 is a schematic architectural diagram of a communication system according to an embodiment of the present disclosure. As shown in FIG. 2, the communication system includes the terminal device 101 and the satellite 102. Wireless communication can be performed between the terminal device 101 and the satellite 102. The network formed between the terminal device 101 and the satellite 102 can also be referred to as the NTN. In the architecture of the communication system shown in FIG. 2, the satellite 102 has the function of a base station, and direct communication is possible between the terminal device 101 and the satellite 102. Under the system architecture, the satellite 102 can be referred to as a network device.

Figure 3:
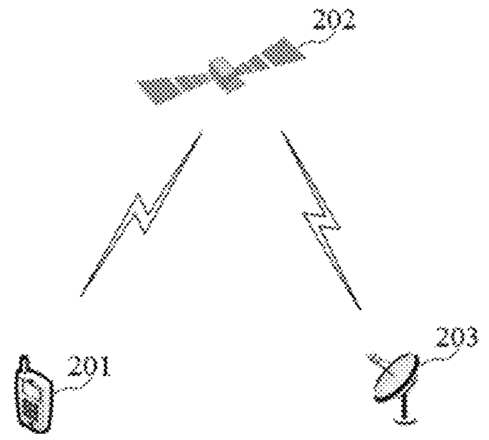
FIG. 3 is a schematic architectural diagram of a communication system according to another embodiment of the present disclosure.

FIG. 3 is a schematic architectural diagram of another communication system according to an embodiment of the present disclosure. As shown in FIG. 3, the communication system includes the terminal device 201, the satellite 202 and the base station 203. Wireless communication can be performed between the terminal device 201 and the satellite 202. Communication can be performed between the satellite 202 and the base station 203. The network formed between the terminal device 201, the satellite 202 and the base station 203 can also be referred to as the NTN. In the architecture of the communication system shown in FIG. 3, the satellite 202 does not function as a base station, and the communication between the terminal device 201 and the base station 203 needs to be relayed by the satellite 202. Under this kind of system architecture, the base station 203 can be referred to as a network device.

In the present disclosure, in a scenario with a large RTT (e.g., NTN), in order to enhance the efficiency of data transmission between the terminal device and the network device, for the downlink pre-configured resource of the terminal device, the network device may configure the state of the HARQ feedback function corresponding to this downlink pre-configured resource for the terminal device. For example, the state of the HARQ feedback function corresponding to the downlink pre-configured resource is configured to be a disabled state. Accordingly, if the terminal device determines that the state of the HARQ feedback function corresponding to the downlink pre-configured resource is the disabled state, then after data is received on the HARQ process, the terminal device does not perform HARQ-ACK message feedback for an HARQ process corresponding to the downlink pre-configured resource. The network device also does not have to wait for the HARQ-ACK message feedback corresponding to this HARQ process, before performing the transmission of other data to the terminal device through this HARQ process. In this way, the need for the network device to wait is eliminated, and the efficiency of data transmission between the terminal device and the network device is enhanced.

In some embodiments, for the uplink pre-configured resource of the terminal device, the network device can configure the state of the HARQ feedback function corresponding to the uplink pre-configured resource for the terminal device. For example, the state of the HARQ feedback function corresponding to the uplink pre-configured resource can be configured as a disabled state. Accordingly, if the terminal device determines that the state of the HARQ feedback function corresponding to the uplink pre-configured resource is the disabled state, then after sending data on the HARQ process corresponding to this uplink pre-configured resource, the terminal device can continue to send data to the network device through the HARQ process, without waiting for feedback from the network device. After receiving the data sent by the terminal device through this HARQ process, the network device can receive the data transmitted by the terminal device through this HARQ process again without providing feedback to the terminal device. In this way, the efficiency of the data transmission between the terminal device and the network device is enhanced.

In the following, the technical solutions shown in the present disclosure are detailed in conjunction with specific embodiments. It should be noted that, the following embodiments can exist independently or in combination with each other. The descriptions of same or similar elements are not repeated in different embodiments. Embodiments of the present disclosure include at least some of the following.

Figure 4:
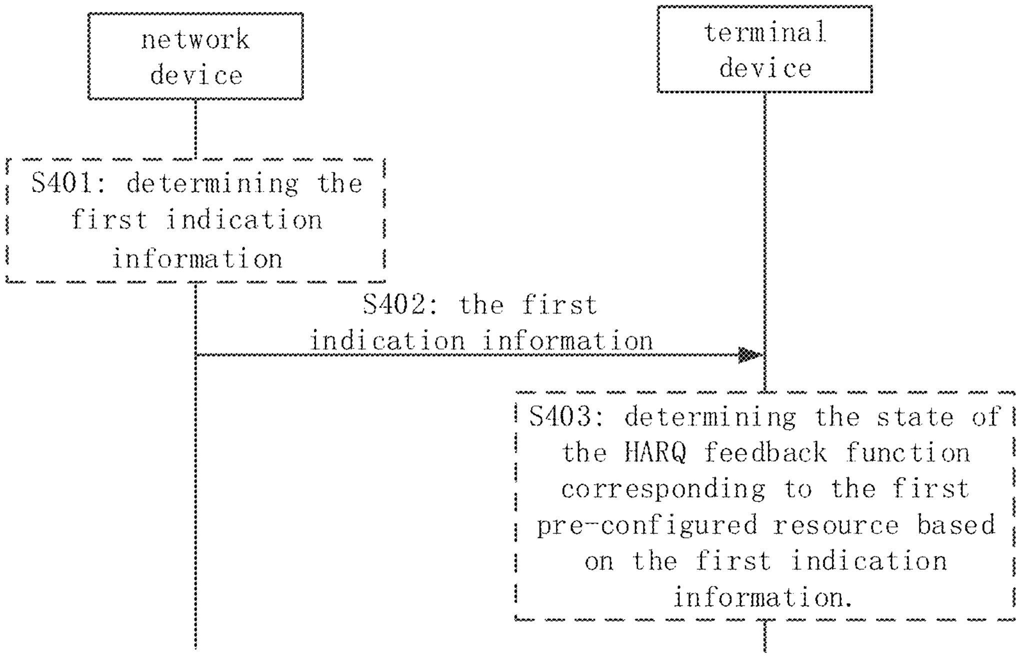
FIG. 4 is a schematic flowchart of a data transmission method according to an embodiment of the present disclosure.

FIG. 4 is a schematic flowchart of a data transmission method according to an embodiment of the present disclosure. The method according to the present embodiment includes operations at blocks illustrated in FIG. 4.

At block S401, the method determines, by the network device, first indication information.

At block S402, the method sends, by the network device, the first indication information to the terminal device.

The first indication information is configured to indicate the state of the HARQ feedback function corresponding to the first pre-configured resource. The state of the HARQ feedback function includes a disabled state or an enabled state. In some embodiments, first indication information is configured to indicate whether the first pre-configured resource is configured with HARQ feedback disability.

In some embodiments, the network device can configure at least one pre-configured resource for the terminal device via high-level signaling (e.g., RRC signaling). The first pre-configured resource can be at least one of the pre-configured resources for which the terminal device is configured. In some embodiments, the first pre-configured resource can be a downlink SPS resource. In some embodiments, the first pre-configured resource can be an uplink CG resource.

In some embodiments, the first pre-configured resource includes the downlink pre-configured resource and/or the uplink pre-configured resource. The downlink pre-configured resource includes the downlink SPS resource. The uplink pre-configured resource includes the CG resource. The CG resource includes type 1 CG resource and/or the type 2 CG resource.

In some embodiments, the terminal device can be configured with one or more downlink pre-configured resources.

In some embodiments, the terminal device can be configured with one or more uplink pre-configured resources.

In the embodiments of the present disclosure, the state of the HARQ feedback function corresponding to each pre-configured resource is an enabled state or a disabled state. The disabled state is also referred to as the disabled condition.

In some embodiments, for a downlink pre-configured resource, if the state of the HARQ feedback function corresponding to the pre-configured resource is the enabled state, then after receiving a transmission block (TB) through a certain HARQ process on this pre-configured resource, the terminal device needs to send the HARQ-ACK message corresponding to the TB to the network device, or the terminal device needs to receive feedback from the network device for that TB before it can use that HARQ process again. In some embodiments, if the state of the HARQ feedback function corresponding to a pre-configured resource is the disabled state, then after receiving a TB through a certain HARQ process on this pre-configured resource, the terminal device does not need to send the HARQ-ACK message corresponding to the TB to the network device, or, the terminal device does not need to receive feedback from the network device for that TB before it can use that HARQ process again. The HARQ-ACK message includes an ACK message or an NACK message corresponding to the decoding result of the TB.

In some embodiments, for an uplink pre-configured resource, if the state of the HARQ feedback function corresponding to the pre-configured resource is the enabled state, then after sending a transmission block TB through a certain HARQ process on this pre-configured resource, the terminal device needs to receive feedback from the network device for that TB before the terminal device can use this HARQ process again (e.g., to send a new TB or send the TB again through this HARQ process). In some embodiments, if the state of the HARQ feedback function corresponding to a pre-configured resource is the disabled state, then after sending a TB through a certain HARQ process on this pre-configured resource, the terminal device does not need to receive feedback from the network device for that TB before the terminal device can use this HARQ process again (e.g. to send a new TB or send the TB again through this HARQ process).

In some embodiments, the time interval between two times of use of the same HARQ process is greater than or equal to a first duration, and/or, the time interval between two times of use of the same HARQ process can be less than a second duration. The first duration is determined based on the decoding time of the receiving device. The second duration is determined based on the RTT. The first duration is less than the second duration.

In some embodiments, the first indication information can indicate that the state of the HARQ feedback function corresponding to the first pre-configured resource is the disabled state. In this case, a physical channel transmitted on the first pre-configured resource does not correspond to the HARQ-ACK message feedback.

In some embodiments, the first indication information can indicate that the state of the HARQ feedback function corresponding to the first pre-configured resource is the enabled state. In this case, the physical channel transmitted on the first pre-configured resource corresponds to the HARQ-ACK message feedback.

In some embodiments, for the downlink transmission, the HARQ-ACK message feedback includes an HARQ-ACK message sent from the terminal device to the network device.

In some embodiments, for the uplink transmission, the HARQ-ACK message feedback includes an HARQ-ACK message sent from the network device to the terminal device, or uplink grant DCI sent from the network device to the terminal device.

When configuring the first pre-configured resource for the terminal device, the network device can indicate the HARQ process for the transmission of the first pre-configured resource. For example, the first pre-configured resource is a downlink SPS resource, and when the network device configures the downlink SPS resource for the terminal device, configuration information corresponding to the SPS resource is sent down to the terminal device, wherein the process available for SPS PDSCH transmission is indicated. For example, the HARQ processes 0, 1, 2, 3, and 4 are available for the SPS transmission. It should be noted that, the above-mentioned 5 HARQ processes (HARQ processes 0, 1, 2, 3 and 4) are available for the SPS transmission and are available for a dynamically scheduled transmission.

For descriptive purposes, in the present embodiment, the HARQ processes, available for the transmission of the first pre-configured resource and determined based on the configuration information corresponding to the first pre-configured resource, are referred to as "the HARQ process determined by the first pre-configured resource" (e.g., the HARQ processes 0, 1, 2, 3, 4 as mentioned above). "The HARQ process determined by the first pre-configured resource" can be used for transmission of the first pre-configured resource at some time and for the dynamically scheduled transmission at other time. Therefore, in the embodiments of the present disclosure, the HARQ process that is actually used for transmission of the first pre-configured resource at a certain time is referred to as the "HARQ process corresponding to the first pre-configured resource"(e.g., when HARQ process 0 is used for the SPS transmission, the HARQ process corresponding to the SPS resource is HARQ process 0).

In some embodiments, the type of each HARQ process can be the first type or the second type. In the following, an HARQ process of the first type and an HARQ process of the second type are respectively introduced.

The HARQ process of the first type includes an HARQ process in which HARQ-ACK message feedback is not performed. That is, after the transmitting terminal has sent a TB to the receiving terminal through the HARQ process, the receiving terminal does not need to send an HARQ-ACK message feedback (e.g., ACK or NACK) to the transmitting terminal, before the transmitting terminal can send a TB again through this HARQ process. The HARQ process of the first type can also be referred as an HARQ process whose state of the HARQ feedback function is a disabled state.

The HARQ process of the second type includes an HARQ process in which HARQ-ACK message feedback is performed. That is, after the transmitting terminal has sent a TB to the receiving terminal through the HARQ process, the receiving terminal needs to send an HARQ-ACK message feedback (e.g., ACK or NACK) to the transmitting terminal, only after receiving the feedback, can the transmitting terminal send a TB again through this HARQ process. The HARQ process of the second type can also be referred as an HARQ process whose state of the HARQ feedback function is an enabled state.

In some embodiments, the first indication information is configured to determine the state of the HARQ feedback function corresponding to the first pre-configured resource, and can include the following cases: the first indication information is configured to determine the state of the HARQ feedback function corresponding to the first pre-configured resource is disabled state, the HARQ process corresponding to the first pre-configured resource is of the first type; or, the first indication information is configured to determine the state of the HARQ feedback function corresponding to the first pre-configured resource is enabled state, the HARQ process corresponding to the first pre-configured resource is of the second type. As an example, assuming that the HARQ process determined by the downlink SPS resource includes the HARQ process 0, then if the state of the HARQ feedback function corresponding to the SPS resource is disabled state, then the HARQ process 0 is of the first type when it is used for SPS transmission (data transmitted on the HARQ process 0 does not correspond to the HARQ-ACK message feedback). When being used for the dynamically scheduled transmission, the HARQ process 0 can be of the first type, or of the second type. If the state of the HARQ feedback function corresponding to the SPS resource is an enabled state, then the HARQ process 0 is of the second type when it is used for the SPS transmission (data transmitted on the HARQ process 0 does not correspond to the HARQ-ACK message feedback). When being used for the dynamically scheduled transmission, the HARQ process 0 can be of the first type, or of the second type.

In some embodiments, the first indication information is configured to determine the state of the HARQ feedback function corresponding to the first pre-configured resource, and can include the following: the first indication information is configured to determine that the state of the HARQ feedback function corresponding to the first pre-configured resource is an disabled state, and the HARQ process determined by the first pre-configured resource is of the first type; or the first indication information is configured to determine that the state of the HARQ feedback function corresponding to the first pre-configured resource is the enabled state, and the HARQ process determined by the first pre-configured resource is of the second type. As an example, assuming that, the HARQ process determined by the downlink SPS resource includes HARQ process 0, then if the state of the HARQ feedback function corresponding to the SPS resource is the disabled state, the HARQ process 0 is of the first type whether it is used for the SPS transmission or the dynamically scheduled transmission (data transmitted on the HARQ process 0 does not correspond to the HARQ-ACK message feedback). If the state of the HARQ feedback function corresponding to the first pre-configured resource is the enabled state, then the HARQ process 0 is of the second type whether it is used for the SPS transmission or the dynamically scheduled transmission (data transmitted on the HARQ process 0 corresponds to the HARQ-ACK message feedback).

In some embodiments, before S402, the method can further include: sending, by the terminal device, capability information to the network device. The capability information is configured to indicate whether the terminal device supports the state of the HARQ feedback function to be a disabled state. In this way, the network device can be informed of the terminal device's capability to support the HARQ feedback disable function. Only when it is determined that the terminal device supports the state of the HARQ feedback function to be the disabled state, will the state of the HARQ feedback function of the first pre-configured resource of the terminal device be configured as the disabled state.

At block S403, the method determines, by the terminal device, the state of the HARQ feedback function corresponding to the first pre-configured resource based on the first indication information.

In embodiments of the present disclosure, according to the first indication information, the terminal device can determine that the state of the HARQ feedback function corresponding to the first pre-configured resource is the disabled state, and the physical channel transmitted on the first pre-configured resource does not correspond to the first pre-configured resource. In some embodiments, according to the first indication information, the terminal device can determine that the state of the HARQ feedback function corresponding to the first pre-configured resource is the enabled state, and the physical channel transmitted on the first pre-configured resource corresponds to the HARQ-ACK message feedback.

In some embodiments, in response to the state of the HARQ feedback function corresponding to the first pre-configured resource being the disabled state, the terminal device determines that the HARQ process corresponding to the first pre-configured resource is of the first type. In some embodiments, in response to the state of the HARQ feedback function corresponding to the first pre-configured resource being the enabled state, the terminal device determines that the HARQ process corresponding to the first pre-configured resource is of the second type.

In some embodiments, in response to the state of the HARQ feedback function corresponding to the first pre-configured resource being the disabled state, the terminal device determines that the HARQ process determined by the first pre-configured resource is of the first type. In some embodiments, in response to the state of the HARQ feedback function corresponding to the first pre-configured resource being the enabled state, the terminal device determines that the HARQ process determined by the first pre-configured resource is of the second type.

In some possible scenarios, the first pre-configured resource includes the downlink SPS resource, after determining the type of the HARQ process corresponding to the first pre-configured resource based on the first indication information, the terminal device can determine whether to perform an HARQ feedback based on the type of the HARQ process. As an example, in response to the HARQ process corresponding to the first pre-configured resource being of the first type, the terminal device, after receiving a downlink TB data on the HARQ process, determines not to perform HARQ-ACK message feedback for the HARQ process. In response to the HARQ process corresponding to the first pre-configured resource being of the second type, the terminal device, after receiving the downlink TB data on the HARQ process, determines to perform HARQ-ACK message feedback for the HARQ process.

In some embodiments, in response to the state of the HARQ feedback function of the downlink SPS resource being the disabled state, the terminal device does not need to perform HARQ feedback to the network device when receiving at least one of the following data. (1) the PDSCH data transmission on the DL SPS resource activated by the PDCCH scheduling, (2) the PDCCH transmission for the release of the DL SPS PDSCH; and (3) the PDSCH transmission of the DL SPS without corresponding PDCCH scheduling.

In another some embodiments, when the state of the HARQ feedback function of the downlink SPS resource is the disabled state, in response to the terminal device receiving the PDCCH transmission for the release of the DL SPS PDSCH, the terminal device needs to send an ACK feedback corresponding to the release of the DL SPS PDSCH to the network device.

In another some possible scenarios, the first pre-configured resource includes an uplink CG resource, after determining the type of the HARQ process corresponding to the first pre-configured resource based on the first indication information, the terminal device can determine whether it is necessary to wait for the HARQ-ACK message feedback based on the type of the HARQ process. As an example, in response to the HARQ process corresponding to the first pre-configured resource being of the first type, the terminal device, after sending the uplink TB data on the first pre-configured resource, determines that it is not necessary to wait for the HARQ-ACK message feedback for the HARQ process from the network device. Thus, the terminal device can continue to send the uplink TB data with this HARQ process. In response to the HARQ process corresponding to the first pre-configured resource being of the second type, the terminal device, after sending the uplink TB data on the first pre-configured resource, determines that it is necessary to wait for the HARQ-ACK message feedback for the HARQ process from the network device. For example, the HARQ-ACK message feedback is the uplink grant scheduling information or downlink feedback information (DFI) for the HARQ process from the network device. Therefore, before receiving the HARQ-ACK message feedback corresponding to the HARQ process, the terminal device cannot use this HARQ process to send other uplink TB data.

In the data transmission method provided in embodiments of the present embodiment, the terminal device can determine, based on the first indication information sent by the network device, the state of the HARQ feedback function corresponding to the first pre-configured resource. If the state of the HARQ feedback function corresponding to the first pre-configured resource is the disabled state, then after data is received on the HARQ process corresponding to the first pre-configured resource by the terminal device, the terminal device does not need to perform HARQ-ACK message feedback for this HARQ process, and the network device also does not have to wait for the HARQ-ACK message feedback, before continuing transmission of other data through this HARQ process. In some embodiments, the terminal device, after sending data on the HARQ process corresponding to the first pre-configured resource, can transmit other data on this HARQ process without waiting for the HARQ-ACK message feedback from the network device. In this way, the data transmission efficiency is enhanced.

In the above-mentioned embodiments, the first indication information is configured to determine the state of the hybrid automatic repeat request HARQ feedback function corresponding to the first pre-configured resource, which can include at least one of the following cases.

Case 1: The first indication information indicates that the state of the HARQ feedback function corresponding to the pre-configured resource configured for the terminal device is the disabled state or the enabled state. For example, when information in a certain information field of the first indication information is first preset information (e.g., TRUE), the first indication information indicates that the state of the HARQ feedback function corresponding to the pre-configured resource configured for the terminal device is the disabled state. When information in a certain information field of the first indication information is second preset information (e.g., FALSE), the first indication information indicates that the state of the HARQ feedback function corresponding to the pre-configured resource configured for the terminal device is the enabled state.

Case 2: If the first indication information is received, then the state of the HARQ feedback function corresponding to the pre-configured resource configured for the terminal device is the disabled state, otherwise, the state of the HARQ feedback function corresponding to the pre-configured resource configured for the terminal device is the enabled state. In some embodiments, if the first indication information is received, then the state of the HARQ feedback function corresponding to the pre-configured resource configured for the terminal device is the enabled state, otherwise, the state of the HARQ feedback function corresponding to the pre-configured resource configured for the terminal device is the disabled state.

In some embodiments, the pre-configured resource configured for the terminal device includes downlink pre-configured resource configured for the terminal device, and/or uplink pre-configured resource configured for the terminal device.

In the above-mentioned case 1 and case 2, the first indication information indicates the state of the HARQ feedback function corresponding to all the pre-configured resources configured for the terminal device. In other words, the network device can provide a unified indication for all pre-configured resources that are configured for the terminal device. Specifically, the first indication information can indicate the state of the HARQ feedback function corresponding to all downlink pre-configured resources configured for the terminal device, or the first indication information can indicate the state of the HARQ feedback function corresponding to all uplink pre-configured resources configured for the terminal device, or the first indication information can indicate the state of the HARQ feedback function corresponding to all the uplink pre-configured resources and all the downlink pre-configured resources configured for the terminal device.

Case 3: The first indication information indicates that the state of the HARQ feedback function corresponding to the first pre-configured resource is the disabled state or the enabled state. For example, when information in an information field of the first indication information is first preset information (e.g., TRUE), the first indication information indicates that the state of the HARQ feedback function corresponding to the first pre-configured resource is the disabled state. When information in an information field of the first indication information is second preset information (e.g., FALSE), the first indication information indicates that the state of the HARQ feedback function corresponding to the first pre-configured resource is the enabled state.

Case 4: If the first indication information is received, then the state of the HARQ feedback function corresponding to the first pre-configured resource is the disabled state, otherwise, the state of the HARQ feedback function corresponding to the first pre-configured resource is the enabled state. In some embodiments, if the first indication information is received, then the state of the HARQ feedback function corresponding to the first pre-configured resource is the enabled state, otherwise, the state of the HARQ feedback function corresponding to the first pre-configured resource is the disabled state.

In the above-mentioned case 3 and case 4, the first indication information indicates the state of the HARQ feedback function corresponding to the first pre-configured resource. That is, the network device can indicate separately for one pre-configured resource or a plurality of pre-configured resources (e.g., a set of pre-configured resources) configured for the terminal device.

In some embodiments of the present disclosure, the state of the HARQ feedback functions of all the pre-configured resources configured for the terminal device can be indicated unitedly, the state of the HARQ feedback functions of one or more pre-configured resources configured for the terminal device can further be indicated respectively. Therefore, flexibility of the configuration is enhanced.

In some embodiments, the first indication information can include at least one of an RRC signaling, a DCI, and a MAC CE. In some embodiments, the first indication information can be a first RRC signaling for configuring the first pre-configured resource. The network device can indicate the state of the HARQ feedback function corresponding to the first pre-configured resource by this first RRC signaling. In another some embodiments, the first indication information can be a second RRC signaling for configuring the first pre-configured resource. The network device can indicate the state of the HARQ feedback function corresponding to the first pre-configured resource by this second RRC signaling. In some other embodiments, the first indication information can be a DCI configured to activate the first pre-configured resource. The network device can indicate the state of the HARQ feedback function corresponding to the first pre-configured resource by this DCI. In yet another embodiment, the first indication information can be a MAC CE configured to activate the first pre-configured resource. The network device can indicate the state of the HARQ feedback function corresponding to the first pre-configured resource by this MAC CE.

It should be noted that, when the first indication information is different information, manners of indicating the state of the HARQ feedback function corresponding to the first pre-configured resource can be different. When the first indication information is different information, each of several possible implementations are described in the following respectively.

In some possible embodiments, the first indication information is a first RRC signaling for configuring the first pre-configured resource. The network device can configure the configuration information corresponding to the first pre-configured resource by the first RRC signaling, and indicate the state of the HARQ feedback function corresponding to the first pre-configured resource. In other words, when configuring the first pre-configured resource for the terminal device, the network device synchronously indicates the state of the HARQ feedback function corresponding to the first pre-configured resource.

In some embodiments, the first indication information includes a first information field of configuration information corresponding to the first pre-configured resource. The first information field is configured to determine the state of the HARQ feedback function. The first information field can be a new information field in the configuration information corresponding to the first pre-configured resource.

Take a case in which the first pre-configured resource is downlink SPS resource as an example, the first RRC signaling is configured to configure the downlink SPS resource. That is, the first RRC signaling includes the configuration information (SPS-Config) of the downlink SPS resource. The configuration information of the downlink SPS resource can include: periodicity information (periodicity), information of the number of HARQ processes (nrofHARQ-Processes), PUCCH resource information (nlPUCCH-AN PUCCH-ResourceId), MCS information (mcs-Table), etc. In the present embodiment, a new first information field (ulHARQ-disabled) can be added to the configuration information of the downlink SPS resource, and configured to indicate whether the HARQ feedback state corresponding to the downlink SPS resource is the disabled state. For example, in response to the first information field (ulHARQ-disabled) existing or a value of the first information field (ulHARQ-disabled) being a preset value (true), it is indicated that the downlink SPS resource has been configured with the HARQ feedback disability. That is, the state of the HARQ feedback function corresponding to the downlink SPS resource is the disabled state. In response to the first information field (ulHARQ-disabled) doing not exist or a value of the first information field (ulHARQ-disabled) being a preset value (false), it is indicated that the downlink SPS resource has not been configured with the HARQ feedback disability. That is, the state of the HARQ feedback function corresponding to the downlink SPS resource is the enabled state.

```
-- ASN1START
-- TAG-SPS-CONFIG-START
SPS-Config ::= SEQUENCE {
  periodicity ENUMERATED {ms10, ms20, ms32, ms40, ms64, ms80, ms128, ms160,
ms320, ms640, spare6, spare5, spare4, spare3, spare2, spare1},
 nrofHARQ-Processes INTEGER (1..8),
 ulHARQ-disabled ENUMERATED {true}
 n1PUCCH-AN PUCCH-ResourceId OPTIONAL, -- Need M
```

-continued

```
mcs-Table ENUMERATED {qam64LowSE} OPTIONAL, -- Need S
...
}
```

In some embodiments, the first indication information can include a second information field in the configuration information corresponding to the first pre-configured resource. The second information field can be an existing information field in the configuration information corresponding to the first pre-configured resource. That is, the state of the HARQ feedback function corresponding to the first pre-configured resource is indicated by reusing the existing information field.

In some embodiments, a value of the second information field is configured to indicate the state of the HARQ feedback function corresponding to the first pre-configured resource. As an example, if the information in the second information field is first preset information, then it is illustrated that the state of the HARQ feedback function corresponding to the first pre-configured resource is the disabled state. If the information in the second information field is second preset information, then it is illustrated that the HARQ feedback state corresponding to the first pre-configured resource is the enabled state.

In the following, with the example of the configuration information corresponding to the downlink SPS resource, several possible examples of the second information field are presented.

As an example, the second information field can be an information field of downlink data to uplink ACK feedback sequence (e.g., dl-DataToUL-ACK) in configuration information (SPS-Config) of the downlink SPS resource. If the information in this information field is a valid value, then it is illustrated that the state of the HARQ feedback function corresponding to the downlink SPS resource is the enabled state. In some embodiments, if the information in this information field is an invalid value, then it is illustrated that the state of the HARQ feedback function corresponding to the downlink SPS resource is the disabled state.

As an example, the second information field can be a PUCCH resource information field in the configuration information of the downlink SPS resource, (e.g., nlPUCCH-AN PUCCH-ResourceId). If the information in this information field is a valid value, then it is illustrated that the state of the HARQ feedback function corresponding to the downlink SPS resource is the enabled state. In some embodiments, if the information in this information field is an invalid value, then it is illustrated that the state of the HARQ feedback function corresponding to the downlink SPS resource is the disabled state.

It should be noted that, regarding to the reuse of the information field illustrated in the above-mentioned embodiments, the information field can be reused separately or in combination, which is not limited in the present embodiment.

It should be appreciated that, when the state of the HARQ feedback function corresponding to the downlink SPS resource is the disabled state, since the information indicated in the information field of downlink data to uplink ACK feedback sequence (e.g., dl-DataToUL-ACK), the PUCCH resource information field (e.g., nlPUCCH-AN PUCCH-ResourceId) and other information field in the original configuration information (SPS-Config) will no longer be used, at least one of the above-mentioned information fields can be reused, to indicate the state of the HARQ feedback function corresponding to the downlink SPS resource. No new information field is necessary, and the signaling length is saved.

In some embodiments, once the terminal device has received the first pre-configured resource configured by the network device, the terminal device can use this first pre-configured resource.

In some embodiments, after the terminal device has received the first pre-configured resource configured by the network device, the terminal device cannot yet use this first pre-configured resource. Instead, the terminal device needs to wait for the activation of the first pre-configured resource before it can use the first pre-configured resource. As an example, the network device can activate the first pre-configured resource through the DCI scrambled by the CS-RNTI. In some embodiments, the network device can activate the first pre-configured resource by MAC CE. In some embodiments, the network device can activate the first pre-configured resource by RRC.

In another some possible embodiments, the first indication information is first DCI for activating the first pre-configured resource. The network device can activate the first pre-configured resource through the first DCI, and indicate the state of the HARQ feedback function corresponding to the first pre-configured resource. In other words, while activating the first pre-configured resource for the terminal device, the network device indicates the state of the HARQ feedback function corresponding to the first pre-configured resource.

In some embodiments, the first DCI is a DCI for activating the first pre-configured resource. If the first pre-configured resource includes a downlink pre-configured resource, then a format of the first DCI can include one DCI format of: DCI format 1_0, DCI format 1_1, and DCI format 1_2. If the first pre-configured resource includes an uplink pre-configured resource, then the format of the first DCI can include one DCI format of: DCI format 0_0, DCI format 0_1, and DCI format 0_2.

In some embodiments, the first indication information includes a third information field of the activation information corresponding to the first pre-configured resource, the third information field is configured to determine the state of the HARQ feedback function. The third information field can be a new information field in the activation information corresponding to the first pre-configured resource.

As an example, the first DCI includes activation information corresponding to the first pre-configured resource. A new third information field can be added to the first DCI. For example, the third information field includes 1 bit of information. If information in the third information field is “1”, then it is illustrated that the state of the HARQ feedback function corresponding to the first pre-configured resource is the disabled state. In some embodiments, if the information in the first information field is “0”, then it is illustrated that the state of the HARQ feedback function corresponding to the first pre-configured resource is the enabled state.

In some embodiments, the first indication information includes a fourth information field of activation information corresponding to the first pre-configured resource. The fourth information field can be an existing information field in the activation information corresponding to the first pre-configured resource. In other words, the state of the HARQ feedback function corresponding to the first pre-configured resource is indicated by reusing the existing information field.

In some embodiments, the information value of the fourth information field is configured to indicate the state of the HARQ feedback function corresponding to the first pre-configured resource. As an example, if the information in the fourth information field is first preset information, then it is illustrated that the HARQ feedback state corresponding to the first pre-configured resource is the disabled state. If the information in the fourth information field is second preset information, then it is illustrated that the HARQ feedback state corresponding to the first pre-configured resource is the enabled state.

In the following, with the example of the activation information corresponding to the downlink SPS resource, several possible examples of the fourth information field are presented.

As an example, the fourth information field can be a PDSCH-to-HARQ_feedback timing indicator in the activation information corresponding to the downlink SPS resource. For example, the chronological set of the downlink data to uplink ACK feedback configured for the terminal device by the network device (e.g., the chronological set configured for the dl-DataToUL-ACK in the first RRC signaling) includes a special value (or an invalid value, or a non-numeric value) or preset value (e.g., 0). When the PDSCH-to-HARQ_feedback timing indicator in the activation information corresponding to the downlink SPS resource indicates a special value or a preset value, it is illustrated that the state of the HARQ feedback function corresponding to the downlink SPS resource is the disabled state. In some embodiments, if the PDSCH to HARQ feedback timing indication field indicates a normal value or a value that is not the preset value, it is indicated that the state of the HARQ feedback function corresponding to the downlink SPS resource is the enabled state.

As an example, the fourth information field can be an information field of HARQ process number in the activation information corresponding to the downlink SPS resource. For example, when all the settings in the information field of HARQ process number are configured as 0, it is illustrated that the state of the HARQ feedback function corresponding to the downlink SPS resource is the enabled state. In some embodiments, when all the settings in the information field of HARQ process number are configured as 1, it is illustrated that the state of the HARQ feedback function corresponding to the downlink SPS resource is the disabled state.

As an example, the fourth information field can be a redundancy version information field in the activation information corresponding to the downlink SPS resource. For example, when the settings of the redundancy version information field are as shown in table 1, it is illustrated that the state of the HARQ feedback function corresponding to the downlink SPS resource is the enabled state. In some embodiments, when the settings of the redundancy version information field are as shown in table 2, it is illustrated that the state of the HARQ feedback function corresponding to the downlink SPS resource is the disabled state.

TABLE 1

| | DCI format 1_0/ DCI format 1_2 | DCI format 1_1 |
|---|---|---|
| Redundancy version | all are set to 0 | for enabled transmission blocks: all are set to 0 |

TABLE 2

| | DCI format 1_0/ DCI format 1_2 | DCI format 1_1 |
|---|---|---|
| Redundancy version | all are set to 1 | for enabled transmission block: all are set to 1 |

It should be noted that, regarding to the reuse of the information fields illustrated in the above-mentioned embodiments, the information fields can be reused separately or in combination, which is not limited in the present embodiment.

In the following, the reuse of the redundancy version information fields of the activation information corresponding to the downlink SPS resource is taken as an example, to illustrate the determining process after the terminal device has received the first indication information. Assuming that the terminal device has received the first DCI scrambled by the CS-RNTI sent by the network device. The NDI field corresponding to the enabled transmission block (TB) in the first DCI is configured as "0". The first DCI is configured to activate the first SPS resource. If the terminal device determines that the settings of the redundancy version information field in the first DCI are as shown in Table 1, then the terminal device determines that the state of the HARQ feedback function corresponding to the first SPS resource is the enabled state. If the terminal device determines that the settings of the redundancy version information field in the first DCI are as shown in Table 2, then the terminal device determines that the state of the HARQ feedback function corresponding to the first SPS resource is the disabled state.

It should be appreciated that, when the state of the HARQ feedback function corresponding to the downlink SPS resource is the disabled state, since the information indicated by the PDSCH-to-HARQ_feedback timing indicator, the information field of HARQ process number, or the redundancy version information field and other information field in the original activation information will no longer be used, the above-mentioned information fields can be reused, to indicate the state of the HARQ feedback function corresponding to the downlink SPS resource. No new information field is necessary, and the signaling length is saved.

In some possible embodiments, the first indication information is second RRC signaling for activating the first pre-configured resource. The network device can activate the first pre-configured resource by the second RRC signaling, and indicate the state of the HARQ feedback function corresponding to the first pre-configured resource. In other words, when activating the first pre-configured resource for the terminal device, the network device indicates the state of the HARQ feedback function corresponding to the first pre-configured resource.

In some embodiments, the network device can add new information field in the second RRC signaling or reuse existing information field, to indicate the state of the HARQ feedback function corresponding to the first pre-configured resource that has been activated. The specific implementation is similar to the previously described implementations and will not be described in detail here.

In some possible embodiments, the first indication information is first MAC CE configured to activate the first pre-configured resource. The network device can activate the first pre-configured resource through the first MAC CE, and indicate the state of the HARQ feedback function corresponding to the first pre-configured resource. In other words, when activating the first pre-configured resource for the terminal device, the network device indicates the state of the HARQ feedback function corresponding to the first pre-configured resource.

In some embodiments, the network device can add new information field in the first MAC CE or reuse existing information field, to indicate the state of the HARQ feedback function corresponding to the first pre-configured resource that has been activated. The specific implementation is similar to the previously described implementations and will not be described in detail here.

It should be noted that, in some embodiments of the present disclosure, the state of the HARQ feedback function of the first pre-configured resource can be indicated when the first pre-configured resource is configured. The state of the HARQ feedback function of the first pre-configured resource can also be indicated when the first pre-configured resource is activated.

The state of the HARQ feedback function of the first pre-configured resource can be indicated when the first pre-configured resource is both configured and activated.

In some embodiments, the state of the HARQ feedback function of the first pre-configured resource can be indicated when the first pre-configured resource is configured. For example, the network device indicates, in the configuration information of the first pre-configured resource, that the state of the HARQ feedback function of the first pre-configured resource is the disabled state. When the first pre-configured resource is activated (even though the state of the HARQ feedback function of the first pre-configured resource is not indicated in the activation information), the HARQ feedback disability of the first pre-configured resource is also activated.

In another some embodiments, the state of the HARQ feedback function of the first pre-configured resource is indicated when the first pre-configured resource is activated. For example, the network device does not indicate the state of the HARQ feedback function of the first pre-configured resource in the configuration information of the first pre-configured resource, but indicate in the activation information of the first pre-configured resource that the state of the HARQ feedback function of the first pre-configured resource is the disabled state. When the first pre-configured resource is activated, the HARQ feedback disability of the first pre-configured resource is also activated.

In yet another embodiment, the state of the HARQ feedback function of the first pre-configured resource is activated when the first pre-configured resource is both configured and activated. For example, the network device indicates, in the configuration information of the first pre-configured resource, that the state of the HARQ feedback function of the first pre-configured resource is the disabled state, and indicates, in the activation information of the first pre-configured resource, that the state of the HARQ feedback function of the first pre-configured resource is the disabled state. Then when the first pre-configured resource is activated, the HARQ feedback disability of the first pre-configured resource is activated.

On the basis of any of the above-mentioned embodiments, if the state of the HARQ feedback function corresponding to the first pre-configured resource is the disabled state, then the transmitting terminal sends data on the HARQ process corresponding to the first pre-configured resource, after the receiving terminal has received the data, the receiving terminal does not need to send the HARQ-ACK message feedback to the transmitting terminal, and the transmitting terminal also does not need to wait for the HARQ-ACK message feedback of the receiving terminal before continuing to send other data on this HARQ process. During the above-mentioned data transmission process, there may be the case that the data is not received at the receiving terminal since there is no HARQ-ACK message feedback. As a result, a less reliable data transmission can be caused.

Figure 5:
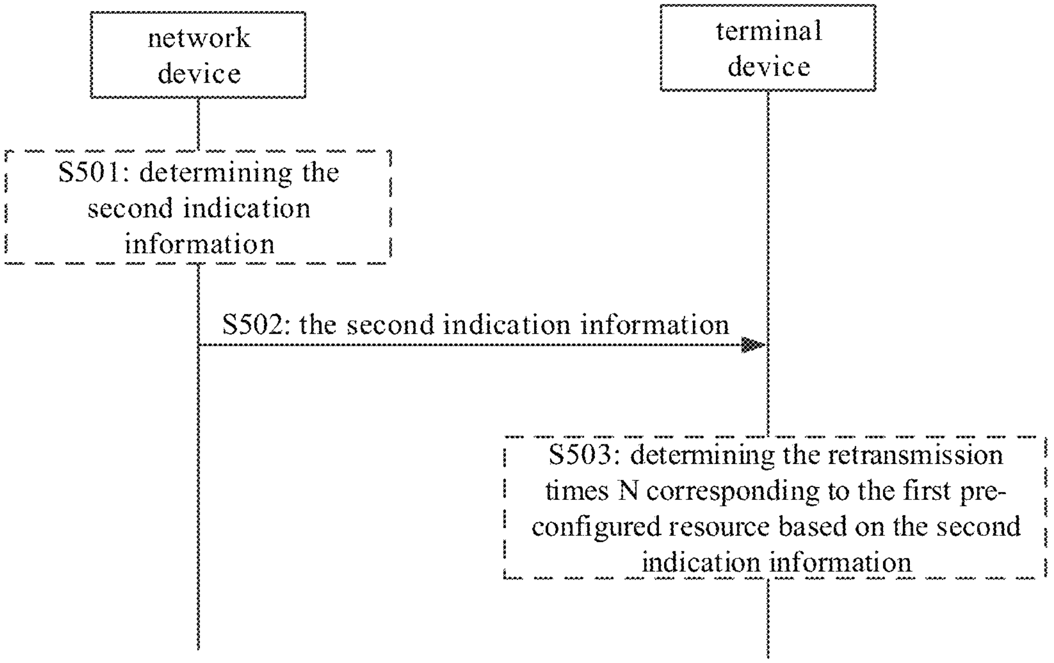
FIG. 5 is a schematic flowchart of a data transmission method according to another embodiment of the present disclosure.

For solving the above-mentioned problems, a schematic flowchart of a data transmission method according to another embodiment of the present disclosure is shown in FIG. 5. On the basis of any one of the above-mentioned embodiments, the network device can further indicate the retransmission times corresponding to the first pre-configured resource to the terminal device. A method of the present embodiment can include operations at blocks illustrated in FIG. 5.

At block S501, the method determines, by the network device, the second indication information.

At block S502, the method sends, by the network device, the second indication information to the terminal device.

The second indication information is configured to determine the retransmission times N (also referred to as the aggregation factor N) corresponding to the first pre-configured resource. N is a positive integer. If the retransmission times corresponding to the first pre-configured resource is N, then the transmitting terminal performs N retransmissions on the first pre-configured resource.

In some embodiments of the present disclosure, when N>1, the N retransmissions include N retransmissions consecutive on the time domain, or N retransmissions on consecutive time slots.

In some embodiments, when the state of the HARQ feedback function corresponding to the first pre-configured resource is the disabled state, the corresponding retransmission times is N1. When the state of the HARQ feedback function corresponding to the first pre-configured resource is the enabled state, the corresponding retransmission times is N2. N1 and N2 are configured separately.

In some embodiments, the second indication information is configured to determine that the transmission block transmitted by each HARQ process of the HARQ processes corresponding to the first pre-configured resource includes N retransmissions.

In some embodiments, the second indication information is configured to determine that the transmission block transmitted by each HARQ process of the HARQ processes determined by the first pre-configured resource includes N retransmissions.

In some embodiments of the present disclosure, a case in which the second indication information is configured to determine the retransmission times N corresponding to the first pre-configured resource can include at least one of the following cases.

Case 1: The second indication information indicates the retransmission times corresponding to the pre-configured resource configured for the terminal device. For example, when the information of a certain information field in the second indication information is N (N is an integer greater or equal to 1), it is indicated that the retransmission times corresponding to all the pre-configured resources configured for the terminal device is N.

Case 2: In response to the second indication information being not received, the retransmission times N corresponding to the pre-configured resource configured for the terminal device is a preset value. For example, N=1.

In some embodiments, the pre-configured resource configured for the terminal device includes the downlink pre-configured resource configured for the terminal device, and/or the uplink pre-configured resource configured for the terminal device.

In the above-mentioned case 1 and case 2, the second indication information indicates the retransmission times corresponding to all the pre-configured resources configured for the terminal device. In other words, the network device can provide unified indication for the retransmission times of all pre-configured resources that are configured for the terminal device.

Case 3: The second indication information indicates the retransmission times N corresponding to the first pre-configured resource. For example, when the information of a certain information field in the second indication information is N, then it is indicated that the retransmission times corresponding to the pre-configured resources is N.

Case 4: In response to the second indication information being not received, the retransmission times corresponding to the first pre-configured resource is a preset value. For example, N=1.

In the above-mentioned case 3 and case 4, the second indication information indicates the retransmission times N corresponding to the first pre-configured resource. That is, the network device can indicate separately for one or a plurality of pre-configured resources (e.g., a set of pre-configured resources) configured for the terminal device.

In some embodiments of the present disclosure, the retransmission times of all the pre-configured resources configured for the terminal device can be indicated unifiedly. The retransmission times of one or more pre-configured resources configured for the terminal device can further be indicated separately. Therefore, the flexibility of configuration is enhanced.

In some embodiments, the second indication information can include at least one of an RRC signaling, a DCI, and an MAC CE. In some embodiments, the second indication information can be an RRC signaling configured to configuring the first pre-configured resource. The network device can indicate the retransmission times N corresponding to the first pre-configured resource by this RRC signaling. In some other embodiments, the second indication information can be an RRC configured to activate the first pre-configured resource. The network device can indicate the retransmission times N corresponding to the first pre-configured resource by this RRC. In some other embodiments, the second indication information can be a DCI configured to activate the first pre-configured resource. The network device can indicate the retransmission times N corresponding to the first pre-configured resource by this DCI. In yet another embodiment, the second indication information can be an MAC CE configured to activate the first pre-configured resource. The network device can indicate the retransmission times N corresponding to the first pre-configured resource by this MAC CE.

It should be noted that, when the second indication information is different, manners of indicating the retransmission times N corresponding to the first pre-configured resource can be different. When the second indication information is different information, each of several possible implementations are described in the following respectively.

In some embodiments, the second indication information is a first RRC signaling for configuring the first pre-configured resource. The network device can configure the configuration information corresponding to the first pre-configured resource by the first RRC signaling, and indicate the retransmission times N corresponding to the first pre-configured resource. In other words, when configuring the first pre-configured resource for the terminal device, the network device synchronously indicates the retransmission times N corresponding to the first pre-configured resource.

In some embodiments, the second indication information includes a fifth information field of configuration information corresponding to the first pre-configured resource. The fifth information field is configured to determine the retransmission times N. The fifth information field can be a new information field in the configuration information corresponding to the first pre-configured resource. The fifth information field can also be an existing information field in the configuration information corresponding to the first pre-configured resource that is reused.

As an example, a value in the fifth information field is configured to indicate the retransmission times N corresponding to the first pre-configured resource. In some embodiments, if the fifth information field is not included in the second indication information, then it is indicated that the retransmission times N corresponding to the first pre-configured resource is equal to 1.

In some possible embodiments, the second indication information is the first DCI or the first MAC CE or the second RRC configured to activate the first pre-configured resource. The network device can activate the first pre-configured resource by the first DCI or the first MAC CE or the second RRC, and indicate the retransmission times corresponding to the first pre-configured resource. In other words, while activating the first pre-configured resource for the terminal device, the network device indicates the retransmission times corresponding to the first pre-configured resource.

In some embodiments, the second indication information includes a sixth information field of the activation information corresponding to the first pre-configured resource. The sixth information field is configured to determine the retransmission times N. The sixth information field can be a new information field in the activation information corresponding to the first pre-configured resource. The sixth information field can also be an existing information field in the activation information corresponding to the first pre-configured resource that is reused.

As an example, a value in the sixth information field is configured to indicate the retransmission times N corresponding to the first pre-configured resource. In some embodiments, if the sixth information field is not included in the second indication information, then it is indicated that the retransmission times N corresponding to the first pre-configured resource is equal to 1.

In the following description, an example of the sixth information field is provided. In some embodiments, the sixth information field can be included in the first DCI/the first MAC CE/the second RRC. Assuming that information in the sixth information field includes 2 bits, then examples of the retransmission times N indicated by the sixth information field are shown as in table 3.

TABLE 3

| Information field | Retransmission times |
| --- | --- |
| 00 | 1 |
| 01 | 2 |
| 10 | 4 |
| 11 | 8 |

It should be noted that, in some embodiments of the present disclosure, the state of the HARQ feedback function corresponding to the first pre-configured resource and the retransmission times N can be indicated by a same indication information (e.g., a case in which the first indication information and the second indication information are the same information). The state of the HARQ feedback function corresponding to the first pre-configured resource and the retransmission times N can also be indicated by different indication information (e.g., a case in which the first indication information and the second indication information are different information). In some embodiments, the network device can indicate both the state of the HARQ feedback function corresponding to the first pre-configured resource and the retransmission times corresponding to the first pre-configured resource in the configuration signaling such as the first RRC signaling. In some other embodiments, the network device can indicate both the state of the HARQ feedback function corresponding to the first pre-configured resource and the retransmission times corresponding to the first pre-configured resource in the activate signaling such as the first DCI/the first MAC CE/the second RRC. In yet another embodiment, the network device can indicate the state of the HARQ feedback function corresponding to the first pre-configured resource in the first RRC signaling, and the network device can indicate the retransmission times corresponding to the first pre-configured resource in the first DCI/the first MAC CE/the second RRC. In yet another embodiment, the network device can indicate the retransmission times corresponding to the first pre-configured resource in the first RRC signaling, and the network device can indicate the state of the HARQ feedback function corresponding to the first pre-configured resource in the first DCI/the first MAC CE/the second RRC.

When the state of the HARQ feedback function corresponding to the first pre-configured resource and the retransmission times N are indicated by a same indication information, the state of the HARQ feedback function and the retransmission times N can be jointly encoded. That is, one information field can be used to indicate the result of the joint encoding of the two kinds of information. In some embodiments, the information field can be the first information field, the second information field, the third information field, or the fourth information field. In the following, the description will be conducted in junction with an example.

For example, in the configuration information corresponding to the first pre-configured resource, the index of the jointly encoded information field is configured as shown in Table 4. That is, the index 00 indicates that the state of the HARQ feedback function is the enabled state, and the retransmission times is 1. The index 01 indicates that the state of the HARQ feedback function is the enabled state, and the retransmission times is 2. The index 10 indicates that the state of the HARQ feedback function is the disabled state, and the retransmission times is 4. The index 11 indicates that the state of the HARQ feedback function is the disabled state, and the retransmission times is 8. Further, the network device can indicate the indexes 00, 01, 10 or 11 in the activation information corresponding to the first pre-configured resource. For example, if a certain information field in the activation information indicates the index 00, then it is illustrated that the HARQ process corresponding to the first pre-configured resource needs to feedback the HARQ-ACK message information, but does not need retransmission. If a certain information field in the activation information indicates the index 10, then it is illustrated that the HARQ process corresponding to the first pre-configured resource does not need to feedback the HARQ-ACK message, and the transmission block in each HARQ process needs 4 retransmissions.

TABLE 4

| Information field | state of the HARQ feedback function | Retransmission times N |
| --- | --- | --- |
| 00 | enabled state | 1 |
| 01 | enabled state | 2 |
| 10 | disabled state | 4 |
| 11 | disabled state | 8 |

It should be appreciated that, in some embodiments of the present disclosure, some or all of the first information field, the second information field, the third information field, the fourth information field, the fifth information field, and the sixth information field can be the same information field when they are not mutually exclusive.

At block S503, the method determines, by the terminal device, the retransmission times N corresponding to the first pre-configured resource based on the second indication information.

After receiving the second indication information, the terminal device can determine the retransmission times N corresponding to the first pre-configured resource according to the second indication information. Further, the terminal device determines that, the transmission block transmitted by each HARQ process of the HARQ processes corresponding to the first pre-configured resource includes N retransmissions. In some embodiments, the terminal device determines that, the transmission block transmitted by each HARQ process of the HARQ processes determined by the first pre-configured resource includes N retransmissions.

In some embodiments, for an HARQ process, if the retransmission times N is greater than 1, then the HARQ process numbers corresponding to the N retransmissions are determined based on the time domain resource of the first transmission of the N transmissions.

In the embodiments of the present disclosure, for an HARQ process, if the retransmission times N is greater than 1, then the N retransmissions are consecutive transmissions, or the N retransmissions are transmissions on consecutive time slots. For example, assuming a TB is transmitted on an HARQ process, for the downlink transmission, if the terminal device determines that the retransmission times of the HARQ process corresponding to the first pre-configured resource is 2, then in one cycle of the first pre-configured resource, the terminal device can receive 2 identical downlink TBs through this HARQ process on two consecutive PDSCHs or PDSCHs on two consecutive time slots. For a further example, for the uplink transmission, if the terminal device determines that the retransmission times of the HARQ process corresponding to the first pre-configured resource is 2, then in one cycle of the first pre-configured resource, the terminal device can send 2 identical uplink TBs through this HARQ process on two consecutive PDSCHs or the PDSCHs on two consecutive time slots.

It should be appreciated that, in the scenario where the state of the HARQ feedback function corresponding to the first pre-configured resource is the disabled state, N retransmissions are performed for the HARQ process corresponding to the first pre-configured resource by the transmitting terminal, such that the receiving terminal can perform joint decoding according to the N retransmissions, and the reliability of data transmission is enhanced.

Further, after determining the retransmission times N of the HARQ process corresponding to the first pre-configured resource, the terminal device can identify whether the data received on the HARQ process is a retransmission or a new transmission according to the retransmission times N. In some embodiments, the terminal device can also determine whether to clear transmission cache for this HARQ process based on the retransmission times N. In some embodiments, for an HARQ process, after the terminal device has received N retransmissions, the $(N+1)^{th}$ transmission can be considered as NDI toggle. That is, the $(N+1)^{th}$ transmission is considered as a new transmission, and the transmission cache for this HARQ process is cleared.

Figure 6:
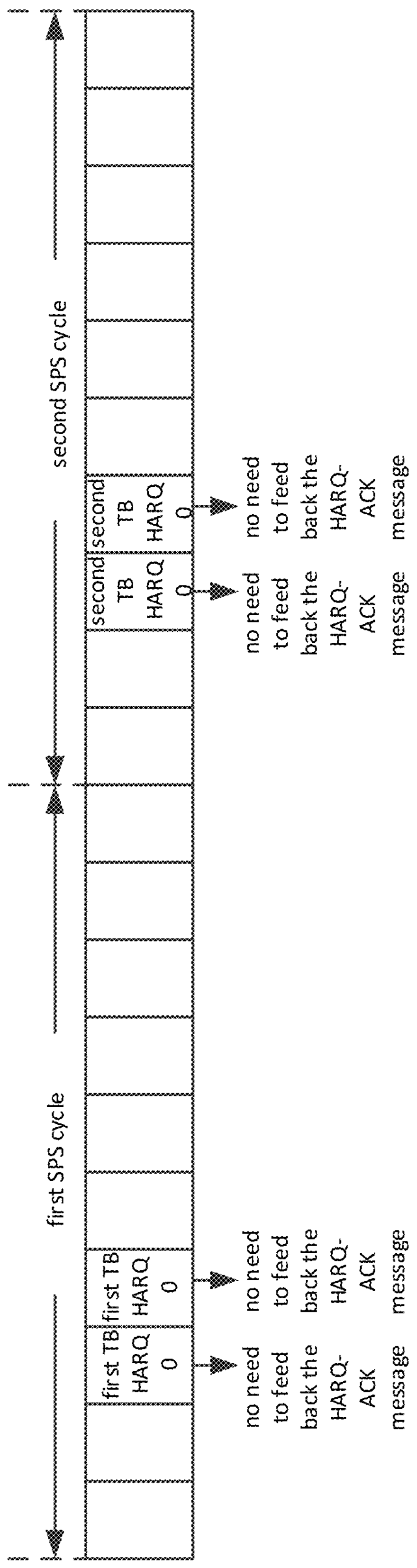
FIG. 6 is a schematic diagram of a data transmission process according to an embodiment of the present disclosure.

In the following, the description will be conducted in junction with an example. FIG. 6 is a schematic diagram of a data transmission process according to an embodiment of the present disclosure. The terminal device is configured with a downlink SPS resource by the network device. The state of the HARQ feedback function corresponding to the downlink SPS resource is the disabled state, and the retransmission times N corresponding to the downlink SPS resource is equal to 2.

As shown in FIG. 6, when the downlink SPS resource is activated for the terminal device, the SPS resource corresponding to the HARQ process 0 is included within the first SPS cycle. The terminal device receives the SPS PDSCH transmitted by the HARQ process 0 on two consecutive time slots of the first SPS cycle. The two SPS PDSCHs are configured for the retransmission of the first TB. The terminal device does not need to feed the HARQ-ACK message corresponding to the first TB to the network device.

The SPS resource corresponding to the HARQ process 0 is included within the second SPS cycle. The terminal device receives the SPS PDSCH transmitted by the HARQ process 0 on two consecutive time slots of the second SPS cycle. The two SPS PDSCHs are configured for the repeated transmission of the second TB. Since the first TB has performed N=2 retransmissions during the first SPS cycle, the terminal device can consider that the second TB transmitted during the second SPS cycle is different from the first TB, or the terminal device can consider the SPS PDSCH transmitted during the second SPS cycle to be a newly transmitted data packet relative to the SPS PDSCH transmitted during the first SPS cycle. Similarly, the terminal device does not need to feedback the HARQ-ACK message corresponding to the second TB to the network device.

In the data transmission method provided in embodiments of the present embodiment, the terminal device determines the retransmission times of the HARQ process corresponding to the first pre-configured resource based on the second indication information sent by the network device, such that the terminal device can repeatedly send or repeatedly receive data on that HARQ process based on that retransmission times, and the reliability of the data transmission is enhanced. Further, the terminal device can identify whether the data received on the HARQ process is a retransmission or a new transmission according to the retransmission times of the HARQ process, such that it is possible to determine when to clear the transmission cache of the HARQ process even without an NDI indication.

Figure 7:
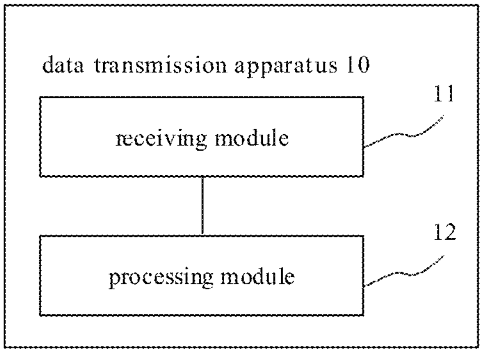
FIG. 7 is a schematic structural diagram of a data transmission apparatus according to an embodiment of the present disclosure.

FIG. 7 is a schematic structural diagram of a data transmission apparatus according to an embodiment of the present disclosure. The data transmission apparatus 10 can be arranged in the terminal device. As shown in FIG. 7, the data transmission apparatus 10 can include a receiving module 11 and a processing module 12.

The receiving module 11 is configured to receive the first indication information from the network device. The first indication information is configured to determine the state of the hybrid automatic repeat request HARQ feedback function corresponding to the first pre-configured resource. The state of the HARQ feedback function includes the disabled state or the enabled state. The processing module 12 is configured to determine, based on the first indication information, the state of the HARQ feedback function corresponding to the first pre-configured resource.

In some embodiments, the processing module 12 is specifically configured to determine that, the state of the HARQ feedback function corresponding to the first pre-configured resource is the disabled state, and the physical channel transmitted on the first pre-configured resource does not correspond to the hybrid automatic repeat request acknowledgement HARQ-ACK message feedback. In some embodiments, the processing module 12 is configured to determine that, the state of the HARQ feedback function corresponding to the first pre-configured resource is the enabled state, and the physical channel transmitted on the first pre-configured resource corresponds to the HARQ-ACK message feedback.

In some embodiments, the processing module 12 is specifically configured to determine that, the state of the HARQ feedback function corresponding to the first pre-configured resource is the disabled state, and a HARQ process corresponding to the first pre-configured resource is of the first type. In some embodiments, the processing module 12 is specifically configured to determine that, the state of the HARQ feedback function corresponding to the first pre-configured resource is the enabled state, and a HARQ process corresponding to the first pre-configured resource is of the second type. The HARQ process of the first type includes an HARQ process in which HARQ-ACK message feedback is not performed. The HARQ process of the second type includes an HARQ process in which HARQ-ACK message feedback is performed.

In some embodiments, the processing module 12 is specifically configured to determine that, the state of the HARQ feedback function corresponding to the first pre-configured resource is the disabled state, and the HARQ process determined by the first pre-configured resource is of the first type. In some embodiments, the processing module 12 is specifically configured to determine that, the state of the HARQ feedback function corresponding to the first pre-configured resource is the enabled state, and the HARQ process determined by the first pre-configured resource is of the second type. The HARQ process of the first type includes an HARQ process in which HARQ-ACK message feedback is not performed. The HARQ process of the second type includes an HARQ process in which HARQ-ACK message feedback is performed.

In some embodiments, the first indication information includes at least one of the following: radio resource control (RRC) signaling, downlink control information (DCI), and a media access control (MAC) control unit (CE).

In some embodiments, the first indication information is configured to determine the state of the hybrid automatic repeat request (HARQ) feedback function corresponding to the first pre-configured resource, which may include at least one of the following cases: the first indication information indicates that the state of the HARQ feedback function corresponding to the pre-configured resource configured for the terminal device is the disabled state or the enabled state; the first indication information indicates that the state of the HARQ feedback function corresponding to the first pre-configured resource is the disabled state or the enabled state; if the first indication information is received, then the state of the HARQ feedback function corresponding to the pre-configured resource configured for the terminal device is the disabled state; and if the first indication information is received, then the state of the HARQ feedback function corresponding to the first pre-configured resource is the disabled state.

In some embodiments, the first indication information includes a first information field of configuration information corresponding to the first pre-configured resource. The first information field is configured to determine the state of the HARQ feedback function.

In some embodiments, the first indication information includes a second information field of configuration information corresponding to the first pre-configured resource. The second information field includes at least one of an information field of downlink data to uplink ACK feedback sequence and an information field of physical uplink control channel PUCCH resource.

In some embodiments, the first indication information includes a third information field of activation information corresponding to the first pre-configured resource. The third information field is configured to determine the state of the HARQ feedback function.

In some embodiments, the first indication information includes a fourth information field of the activation information corresponding to the first pre-configured resource. The fourth information field includes at least one information field of: an indication field for the feedback time from the physical downlink shared channel PDSCH to the HARQ, an information field of HARQ process number, and an information field of redundant version.

In some embodiments, the receiving module 11 is also configured to: receive, from the network device, second indication information. The second indication information is configured to determine retransmission times N corresponding to the first pre-configured resource. The processing module 12 is also configured to determine, based on the second indication information, the retransmission times N corresponding to the first pre-configured resource.

In some embodiments, the processing module 12 is also specifically configured to determine that, the transmission block transmitted by each HARQ process of the HARQ processes corresponding to the first pre-configured resource includes N retransmissions. In some embodiments, the processing module 12 is also specifically configured to determine that, the transmission block transmitted by each HARQ process of the HARQ processes determined by the first pre-configured resource includes N retransmissions.

In some embodiments, the second indication information includes at least one information of: radio resource control (RRC) signaling, downlink control information (DCI), and a media access control (MAC) control unit (CE).

In some embodiments, the second indication information is configured to determine the retransmission times N corresponding to the first pre-configured resource, which may include at least one of the following cases: the second indication information indicates the retransmission times N corresponding to the pre-configured resource configured for the terminal device; the second indication information indicates the retransmission times N corresponding to the first pre-configured resource; if the second indication information is not received, then the retransmission times N corresponding to the pre-configured resource configured for the terminal device is equal to 1, i.e., N=1; and if the second indication information is not received, then the retransmission times N corresponding to the first pre-configured resource is equal to 1, i.e., N=1.

In some embodiments, the second indication information includes a fifth information field of configuration information corresponding to the first pre-configured resource. The fifth information field is configured to determine the retransmission times N.

In some embodiments, the second indication information includes a sixth information field of activation information corresponding to the first pre-configured resource. The sixth information field is configured to determine the retransmission times N.

Figure 8:
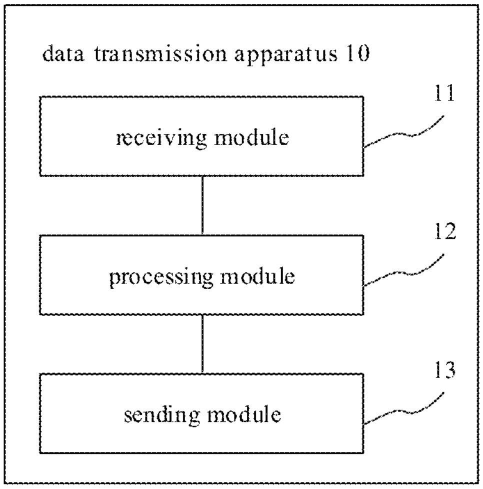
FIG. 8 is a schematic structural diagram of a data transmission apparatus according to another embodiment of the present disclosure.

FIG. 8 is a schematic structural diagram of a data transmission apparatus according to another embodiment of the present disclosure. As shown in FIG. 8, on the basis of the embodiment shown in FIG. 7, the data transmission apparatus 10 further includes a sending module 13. The sending module 13 is configured to send capability information to the network device. The capability information is configured to indicate whether the terminal device supports the state of the HARQ feedback function to be the disabled state.

In some embodiments, the first pre-configured resource includes a downlink pre-configured resource or an uplink pre-configured resource.

The data transmission apparatus provided according to an embodiment of the present disclosure can perform the technical solutions shown in the method embodiments mentioned above, and its implementation principle and beneficial effects are similar and will not be described here.

Figure 9:
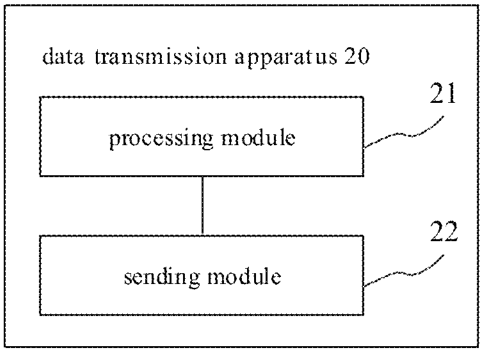
FIG. 9 is a schematic structural diagram of a data transmission apparatus according to yet another embodiment of the present disclosure.

FIG. 9 is a schematic structural diagram of a data transmission apparatus according to yet another embodiment of the present disclosure. The data transmission apparatus 20 can be arranged in the network device. As shown in FIG. 9, the data transmission apparatus 20 can include a processing module 21 and a sending module 22.

The processing module 21 is configured to generate the first indication information. The first indication information is configured to determine the state of the hybrid automatic repeat request HARQ feedback function corresponding to the first pre-configured resource. The state of the HARQ feedback function includes the disabled state or the enabled state. The sending module 22 is configured to send the first indication information to the terminal device. The first indication information is configured for the terminal device to determine the state of the HARQ feedback function corresponding to the first pre-configured resource.

In some embodiments, the first indication information includes at least one information of: radio resource control RRC signaling, downlink control information DCI, and a media access control MAC control unit CE.

In some embodiments, the first indication information is configured to indicate the state of the hybrid automatic repeat request HARQ feedback function corresponding to the first pre-configured resource. Any one of the following cases can be included: the first indication information indicates that the state of the HARQ feedback function corresponding to the pre-configured resource configured for the terminal device is the disabled state or the enabled state; the first indication information indicates that the state of the HARQ feedback function corresponding to the first pre-configured resource is the disabled state or the enabled state; if the first indication information is sent, then the state of the HARQ feedback function corresponding to the pre-configured resource configured for the terminal device is the disabled state; and if the first indication information is sent, then the state of the HARQ feedback function corresponding to the first pre-configured resource is the disabled state.

In some embodiments, the first indication information includes the first information field of configuration information corresponding to the first pre-configured resource. The first information field is configured to determine the state of the HARQ feedback function.

In some embodiments, the first indication information includes the second information field of configuration information corresponding to the first pre-configured resource. The second information field includes at least one information field of: the information field of downlink data to uplink ACK feedback sequence, the information field of physical uplink control channel PUCCH resource.

In some embodiments, the first indication information includes the third information field of the activation information corresponding to the first pre-configured resource. The third information field is configured to determine the state of the HARQ feedback function.

In some embodiments, the first indication information includes the fourth information field of the activation information corresponding to the first pre-configured resource. The fourth information field includes at least one information field of: the indication field for the feedback time from the physical downlink shared channel PDSCH to the HARQ, the information field of HARQ process number, and the information field of redundant version.

In some embodiments, the sending module 22 is also configured to: send the second indication information to the terminal device. The second indication information is configured to determine retransmission times N corresponding to the first pre-configured resource.

In some embodiments, the second indication information includes at least one information of: the radio resource control RRC signaling, the downlink control information DCI, and the media access control MAC control unit CE.

In some embodiments, the second indication information is configured to determine the retransmission times N corresponding to the first pre-configured resource. At least one of the following cases can be included: the second indication information indicates the retransmission times N corresponding to the pre-configured resource configured for the terminal device; the second indication information indicates the retransmission times N corresponding to the first pre-configured resource; if the second indication information is not sent, then the retransmission times N corresponding to the pre-configured resource configured for the terminal device is equal to 1, i.e., N=1; and if the second indication information is not sent, then the retransmission times N corresponding to the first pre-configured resource is equal to 1, i.e., N=1.

In some embodiments, the second indication information includes the fifth information field of configuration information corresponding to the first pre-configured resource. The fifth information field is configured to determine the retransmission times N.

In some embodiments, the second indication information includes the sixth information field of the activation information corresponding to the first pre-configured resource. The sixth information field is configured to determine the retransmission times N.

Figure 10:
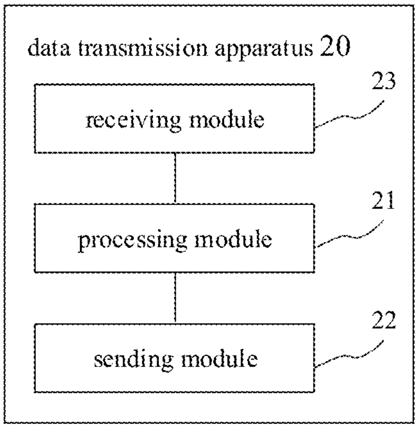
FIG. 10 is a schematic structural diagram of a data transmission apparatus according to yet another embodiment of the present disclosure.

FIG. 10 is a schematic structural diagram of a data transmission apparatus according to yet another embodiment of the present disclosure. As shown in FIG. 10, on the basis of the embodiment shown in FIG. 9, the data transmission apparatus 20 further includes a receiving module 23. The receiving module 23 is configured to receive the capability information from the terminal device. The capability information is configured to indicate whether the terminal device supports the state of the HARQ feedback function to be the disabled state.

In some embodiments, the first pre-configured resource includes the downlink pre-configured resource or the uplink pre-configured resource.

The data transmission apparatus provided according to an embodiment of the present disclosure can perform the technical solutions shown in the method embodiment above, and its implementation principle and beneficial effects are similar and will not be described here.

Figure 11:
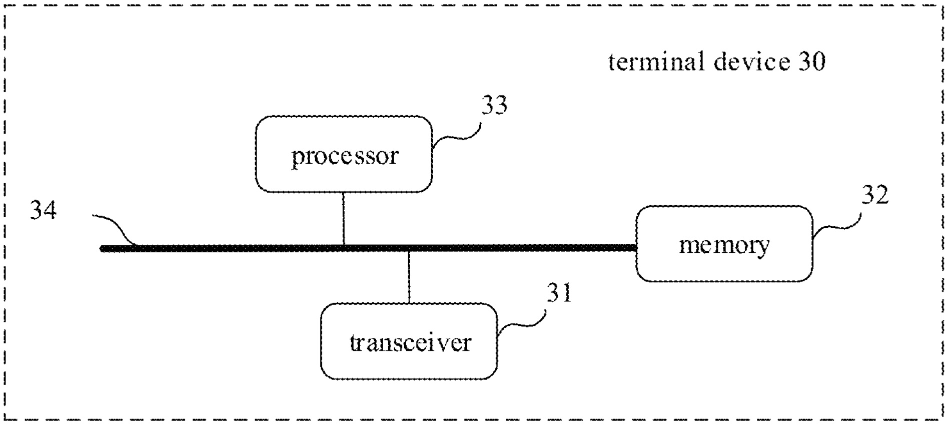
FIG. 11 is a schematic structural diagram of a terminal device according to an embodiment of the present disclosure.

FIG. 11 is a schematic structural diagram of a terminal device according to an embodiment of the present disclosure. As shown in FIG. 11, the terminal device 30 can include: a transceiver 31, a memory 32 and a processor 33. The transceiver 31 can include: a transmitter and/or a receiver. The transmitter can also be referred to as a sender, a transmitting machine, a transmitting port, or transmitting interface, and the like. The receiver can also be referred to as a receptor, a receiving machine, a receiving port, or a receiving interface, and the like. As an example, each one of the transceiver 31, the memory 32 and the processor 33 is interconnected with each other through a bus 34.

The memory 32 is configured to store a program instruction. The processor 33 is configured to execute the program instruction stored in the memory, such that the terminal device 30 can perform any of the data transmission methods mentioned above.

The receiver of the transceiver 31 can be used to perform the receiving function of the terminal device in the above-mentioned data transmission method. The transmitter of the transceiver 31 can be used to perform the transmitting function of the terminal device in the above-mentioned data transmission method.

The terminal device provided according to an embodiment of the present disclosure can perform the technical solutions shown in the method embodiments above, and its implementation principle and beneficial effects are similar and will not be described here.

Figure 12:
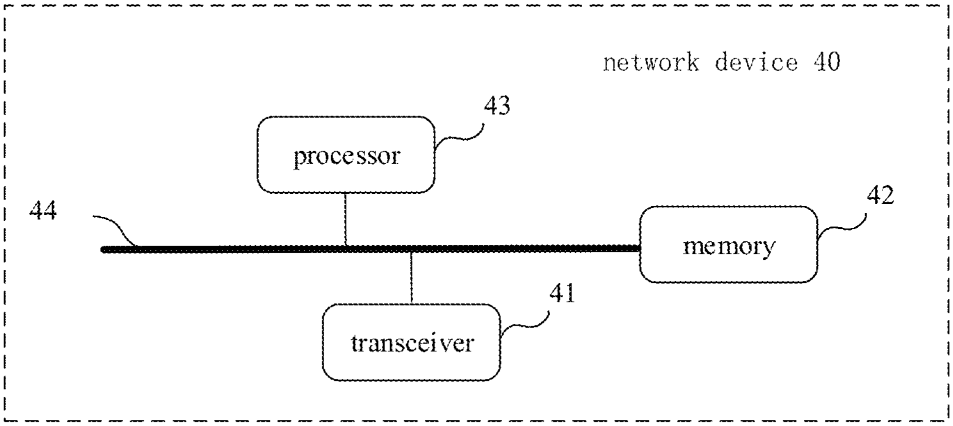
FIG. 12 is a schematic structural diagram of a network device according to an embodiment of the present disclosure.

FIG. 12 is a schematic structural diagram of a network device according to an embodiment of the present disclosure. As shown in FIG. 12, the network device 40 can include: a transceiver 41, a memory 42 and a processor 43. The transceiver 41 can include: a transmitter and/or a receiver. The transmitter can also be referred to as a sender, a transmitting machine, a transmitting port, or transmitting interface, and the like. The receiver can also be referred to as a receptor, a receiving machine, a receiving port, or a receiving interface, and the like. As an example, each one of the transceiver 41, the memory 42 and the processor 43 is interconnected with each other through a bus 44.

The memory 42 is configured to store a program instruction. The processor 43 is configured to execute the program instruction stored in the memory, such that the network device 40 can perform any of the data transmission methods mentioned above.

The transmitter of the transceiver 41 can be used to perform the sending function of the network device in the above-mentioned data transmission method.

The network device provided according to an embodiment of the present disclosure can perform the technical solutions shown in the method embodiment above, and its implementation principle and beneficial effects are similar and will not be described here.

A computer readable storage medium is provided in the embodiments of the present disclosure. Computer-executable instructions are stored in the computer readable storage medium. When the computer-executable instructions are implemented by the processor, the above-mentioned data transmission methods will be implemented. The principles of implementation and beneficial effects of the data transmission method is similar and will not be repeated here.

A computer program product can be further provided in the embodiments of the present disclosure. The computer program product can be executed by a processor. When being executed, the computer program product can implement the data transmission methods executed by any one of the terminal devices. The principles of implementation and beneficial effects of the data transmission methods are similar and will not be repeated here.

A kind of system-on-a-chip is provided in the embodiments of the present disclosure. The system-on-a-chip can be applied to the terminal device. The system-on-a-chip includes: at least a communication interface, at least a processor and at least a memory. The communication interface, the memory and the processor are interconnected through a bus. The processor executes instructions stored in the memory, such that the base station can implement the above-mentioned data transmission methods.

A kind of system-on-a-chip is provided in the embodiments of the present disclosure. The system-on-a-chip can be applied to the network device. The system-on-a-chip includes: at least a communication interface, at least a processor and at least a memory. The communication interface, the memory and the processor are interconnected through a bus. The processor executes instructions stored in the memory, such that the base station can implement the above-mentioned data transmission methods.

All or a part of the operations of each of the above method embodiments can be implemented by a hardware relating to a program instruction. The afore-mentioned program can be stored in a readable memory. The program, when being executed, performs the steps including each of the method embodiments described above. The afore-mentioned memory (storage medium) includes: a read-only memory (ROM), an RAM, a flash memory, a hard disk, a solid state drive, a magnetic tape, a floppy disk, an optical disc and any combination thereof.

The embodiments of the present disclosure are described with reference to flowcharts and/or block diagrams of methods, devices (systems), and computer program products according to embodiments of the present disclosure. It should be understood that, each process and/or block in a flowchart and/or block diagram, and the combination of processes and/or blocks in a flowchart and/or block diagram, can be implemented by computer program instructions. These computer program instructions can be provided to the processing unit of a general-purpose computer, a specialized computer, an embedded processor or other programmable data processing device to generate a machine, such that the instructions performed by a processing unit of a computer or other programmable data processing device generate an apparatus. The apparatus can be configured to achieve the function specified in one or more processes in the flowchart and/or in one or more blocks of the block diagram.

These computer program instructions can also be stored in a computer readable memory capable of directing a computer or other programmable data processing device to operate in a particular manner, such that the instructions stored in the computer readable memory produce an article of manufacture that includes an instruction apparatus. The instruction apparatus achieves the function specified in one or more processes of the flowchart and/or one or more blocks of the block diagram.

These computer program instructions can also be loaded into a computer or other programmable data processing devices, such that a series of operating steps are executed on the computer or other programmable data processing devices to generate a processing achieved by the computer. In this way, the instructions executed on the computer or other programmable devices provide steps for achieving the function specified in one or more processes of the flowchart and/or one or more blocks of the block diagram.

Apparently, a person skilled in the art can make various modifications and variations to embodiments of the present disclosure without departing from the spirit and scope of the present disclosure. Thus, if these modifications and variations of the embodiments of the present disclosure fall within the scope of the claims of the present disclosure and their technical equivalents, then these modifications and variations are intended to be included in the present disclosure. In the present disclosure, the term "includes" and variations thereof can refer to non-limiting inclusions. The terms "first", "second" and the like in the present disclosure are used for distinguishing between similar items and not necessarily for describing a particular sequential or chronological order. In the present disclosure, "a plurality of" means two or more than two.

What is claimed is:

1. A data transmission method, comprising:

receiving, by a terminal device, first indication information from a network device, the first indication information being configured to determine a state of a hybrid automatic repeat request (HARQ) feedback function corresponding to a first pre-configured resource, and the state of the HARQ feedback function comprising a disabled state or an enabled state, wherein the first pre-configured resource comprises one downlink pre-configured resource, the one downlink pre-configured resource comprises a downlink semi-persistent scheduling (SPS) resource;

determining, by the terminal device, the state of the HARQ feedback function corresponding to the downlink SPS resource based on the first indication information;

in response to the state of the HARQ feedback function of the downlink SPS resource being the disabled state which is for a physical downlink shared channel (PDSCH) data transmission on the downlink SPS resource activated by a physical downlink control channel (PDCCH) scheduling, performing no HARQ feedback to the network device when receiving the PDSCH data transmission; and in response to the state of the HARQ feedback function of the downlink SPS resource being the enabled state, performing a HARQ feedback to the network device, wherein the first indication information is a first radio resource control (RRC) signaling for configuring the first pre-configured resource, so that the first RRC signaling is not only used to indicate the state of the HARQ feedback function, but also used to configure the downlink SPS resource;

wherein the method further comprises:

receiving, by the terminal device, second indication information from the network device, the second indication information being configured to determine a retransmission times N corresponding to the downlink SPS resource; and determining, by the terminal device, the retransmission times N corresponding to the downlink SPS resource based on the second indication information;

wherein the second indication information comprises a fifth information field of configuration information corresponding to the downlink SPS resource, and the fifth information field is configured to determine the retransmission times N.

2. The method of claim 1, wherein determining the state of the HARQ feedback function corresponding to the downlink SPS resource comprises:

determining the state of the HARQ feedback function corresponding to the downlink SPS resource being the disabled state, the downlink SPS resource corresponding to an HARQ process of a first type, and the HARQ process of the first type comprising an HARQ process in which an HARQ-ACK message feedback is not performed; or determining the state of the HARQ feedback function corresponding to the downlink SPS resource being the enabled state, the downlink SPS resource corresponding to an HARQ process of a second type, and the HARQ process of the second type comprising an HARQ process in which the HARQ-ACK message feedback is performed.

3. The method of claim 1, wherein determining the state of the HARQ feedback function corresponding to the downlink SPS resource comprises:

determining the state of the HARQ feedback function corresponding to the downlink SPS resource being the disabled state, the downlink SPS resource determining an HARQ process of a first type, and the HARQ process of the first type comprising an HARQ process in which an HARQ-ACK message feedback is not performed; or determining the state of the HARQ feedback function corresponding to the downlink SPS resource being the enabled state, the downlink SPS resource determining an HARQ process of a second type, and the HARQ process of the second type comprising an HARQ process in which the HARQ-ACK message feedback is performed.

4. The method of claim 1, wherein a case in which the first indication information is configured to determine the state of the hybrid automatic repeat request HARQ feedback function corresponding to the downlink SPS resource comprises at least one of the following:

a case in which the first indication information indicates that the state of the HARQ feedback function corresponding to the pre-configured resource configured for the terminal device is the disabled state or the enabled state;

a case in which the first indication information indicates that the state of the HARQ feedback function corresponding to the downlink SPS resource is the disabled state or the enabled state;

a case in which the state of the HARQ feedback function corresponding to the pre-configured resource configured for the terminal device is the disabled state, in response to the first indication information being received; and a case in which the state of the HARQ feedback function corresponding to the downlink SPS resource is the disabled state, in response to the first indication information being received.

5. The method of claim 1, wherein the first indication information comprises a first information field of configuration information corresponding to the downlink SPS resource, and the first information field is configured to determine the state of the HARQ feedback function.

6. The method of claim 1, wherein the first indication information comprises a second information field of configuration information corresponding to the downlink SPS resource, and the second information field comprises at least one information field of the following:

an information field of downlink data to uplink ACK feedback sequence, and an information field of physical uplink control channel (PUCCH) resource.

7. The method of claim 1, wherein the first indication information comprises a third information field of activation information corresponding to the downlink SPS resource, and the third information field is configured to determine the state of the HARQ feedback function.

8. The method of claim 1, wherein the first indication information comprises a fourth information field of activation information corresponding to the downlink SPS resource, and the fourth information field comprises at least one information field of the following:

an indication field for feedback time from a PDSCH to the HARQ, an information field of HARQ process number, and an information field of redundant version.

9. The method of claim 1, wherein determining the retransmission times N corresponding to the downlink SPS resource comprises:

determining that a transmission block transmitted by each HARQ process corresponding to the downlink SPS resource comprises N retransmissions.

10. The method of claim 1, wherein determining the retransmission times N corresponding to the downlink SPS resource comprises:

determining that a transmission block transmitted by each HARQ process determined by the downlink SPS resource comprises N retransmissions.

11. The method of claim 1, wherein the second indication information comprises at least one of: RRC signaling, downlink control information (DCI), and a media access control (MAC) control unit (CE).

12. The method of claim 1, wherein a case in which the second indication information is configured to determine the retransmission times N corresponding to the downlink SPS resource comprises at least one of the following:

a case in which the second indication information indicates the retransmission times N corresponding to a pre-configured resource configured for the terminal device;

a case in which the second indication information indicates the retransmission times N corresponding to the downlink SPS resource;

a case in which the retransmission times N corresponding to the pre-configured resource configured for the terminal device is equal to 1, in response to the second indication information being not received; and a case in which the retransmission times N corresponding to the downlink SPS resource is equal to 1, in response to the second indication information being not received.

13. The method of claim 1, wherein the second indication information further comprises a sixth information field of activation information corresponding to the downlink SPS resource, and the sixth information field is configured to determine the retransmission times N.

14. The method of claim 1, wherein before receiving, by the terminal device, the first indication information from the network device, the method further comprises:

sending, by the terminal device, capability information to the network device, the capability information being configured to indicate whether the terminal device supports the state of the HARQ feedback function to be the disabled state.

15. A terminal device, comprising:

a transceiver, a processor, and a memory;

wherein the memory stores a computer-executable instruction;

wherein the processor is configured to execute the computer-executable instruction stored in the memory, to cause the terminal device to implement a data transmission method, comprising:

receiving first indication information from a network device, the first indication information being configured to determine a state of a hybrid automatic repeat request (HARQ) feedback function corresponding to a first pre-configured resource, and the state of the HARQ feedback function comprising a disabled state or an enabled state, wherein the first pre-configured resource comprises one downlink pre-configured resource, the one downlink pre-configured resource comprises a downlink semi-persistent scheduling (SPS) resource;

determining the state of the HARQ feedback function corresponding to the downlink SPS resource based on the first indication information;

in response to the state of the HARQ feedback function of the downlink SPS resource being the disabled state which is for a physical downlink shared channel (PDSCH) data transmission on the downlink SPS resource activated by a physical downlink control channel (PDCCH) scheduling, performing no HARQ feedback to the network device when receiving the PDSCH data transmission; and in response to the state of the HARQ feedback function of the downlink SPS resource being the enabled state, performing a HARQ feedback to the network device, wherein the first indication information is a first radio resource control (RRC) signaling for configuring the first pre-configured resource, so that the first RRC signaling is not only used to indicate the state of the HARQ feedback function, but also used to configure the downlink SPS resource;

wherein the processor is further configured to execute the computer-executable instruction stored in the memory, to cause the terminal device to perform operations of:

receiving second indication information from the network device, the second indication information being configured to determine a retransmission times N corresponding to the downlink SPS resource; and determining the retransmission times N corresponding to the downlink SPS resource based on the second indication information;

wherein the second indication information comprises a fifth information field of configuration information corresponding to the downlink SPS resource, and the fifth information field is configured to determine the retransmission times N.

16. The terminal device of claim 15, wherein the processor is further configured to execute the computer-executable instruction stored in the memory, to cause the terminal device to perform operations of:

determining the state of the HARQ feedback function corresponding to the downlink SPS resource being the disabled state, the downlink SPS resource corresponding to an HARQ process of a first type, and the HARQ process of the first type comprising an HARQ process in which an HARQ-ACK message feedback is not performed; or determining the state of the HARQ feedback function corresponding to the downlink SPS resource being the enabled state, the downlink SPS resource corresponding to an HARQ process of a second type, and the HARQ process of the second type comprising an HARQ process in which the HARQ-ACK message feedback is performed.

17. The terminal device of claim 15, wherein the processor is further configured to execute the computer-executable instruction stored in the memory, to cause the terminal device to perform operations of:

determining the state of the HARQ feedback function corresponding to the downlink SPS resource being the disabled state, the downlink SPS resource determining an HARQ process of a first type, and the HARQ process of the first type comprising an HARQ process in which an HARQ-ACK message feedback is not performed; or determining the state of the HARQ feedback function corresponding to the downlink SPS resource being the enabled state, the downlink SPS resource determining an HARQ process of a second type, and the HARQ process of the second type comprising an HARQ process in which the HARQ-ACK message feedback is performed.

18. The terminal device of claim 15, wherein a case in which the first indication information is configured to determine the state of the hybrid automatic repeat request HARQ feedback function corresponding to the downlink SPS resource comprises at least one of the following:

a case in which the first indication information indicates that the state of the HARQ feedback function corresponding to the pre-configured resource configured for the terminal device is the disabled state or the enabled state;

a case in which the first indication information indicates that the state of the HARQ feedback function corresponding to the downlink SPS resource is the disabled state or the enabled state;

a case in which the state of the HARQ feedback function corresponding to the pre-configured resource configured for the terminal device is the disabled state, in response to the first indication information being received; and a case in which the state of the HARQ feedback function corresponding to the downlink SPS resource is the disabled state, in response to the first indication information being received.

19. The terminal device of claim 15, wherein the first indication information comprises a first information field of configuration information corresponding to the downlink SPS resource, and the first information field is configured to determine the state of the HARQ feedback function.

20. The terminal device of claim 15, wherein the first indication information comprises a second information field of configuration information corresponding to the downlink SPS resource, and the second information field comprises at least one information field of the following:

an information field of downlink data to uplink ACK feedback sequence, and an information field of physical uplink control channel (PUCCH) resource.

* * * * *